US012110569B2

(12) United States Patent
Ichie et al.

(10) Patent No.: US 12,110,569 B2
(45) Date of Patent: Oct. 8, 2024

(54) NON ORIENTED ELECTRICAL STEEL SHEET AND METHOD FOR PRODUCING THEREOF

(71) Applicant: NIPPON STEEL CORPORATION, Tokyo (JP)

(72) Inventors: Takeru Ichie, Tokyo (JP); Masaru Takahashi, Tokyo (JP); Fuminobu Murakami, Tokyo (JP); Shinichi Matsui, Tokyo (JP); Masahiro Yamamoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 454 days.

(21) Appl. No.: 17/437,726

(22) PCT Filed: Mar. 20, 2019

(86) PCT No.: PCT/JP2019/011663

§ 371 (c)(1),
(2) Date: Sep. 9, 2021

(87) PCT Pub. No.: WO2020/188783

PCT Pub. Date: Sep. 24, 2020

(65) Prior Publication Data

US 2022/0145418 A1 May 12, 2022

(51) Int. Cl.
*C21D 9/46* (2006.01)
*C21D 6/00* (2006.01)
(Continued)

(52) U.S. Cl.
CPC ............... *C21D 9/46* (2013.01); *C21D 6/005* (2013.01); *C21D 6/008* (2013.01); *C21D 8/1222* (2013.01); *C21D 8/1233* (2013.01); *C21D 8/1272* (2013.01); *C22C 38/001* (2013.01); *C22C 38/002* (2013.01); *C22C 38/005* (2013.01);
(Continued)

(58) Field of Classification Search
None
See application file for complete search history.

(56) References Cited

U.S. PATENT DOCUMENTS

2004/0149355 A1* 8/2004 Kohno .................... C22C 38/04 148/307
2018/0030558 A1* 2/2018 Okubo .................. C22C 38/008
(Continued)

FOREIGN PATENT DOCUMENTS

JP 60-103121 A 6/1985
JP 2-258922 A 10/1990
(Continued)

OTHER PUBLICATIONS

Shikano—JP 2018003049 A—PCT D1—MT—electrical steel sheet—Jan. 2018 (Year: 2018).*

*Primary Examiner* — John Vincent Lawler
(74) *Attorney, Agent, or Firm* — Birch, Stewart, Kolasch & Birch, LLP

(57) ABSTRACT

A non oriented electrical steel sheet consists of a silicon steel sheet and an insulation coating. The silicon steel sheet contains Si, Al, and Mn as chemical composition, and an alignment degree to {5 5 7}<7 14 5> orientation in a central area along a thickness direction of the silicon steel sheet is 12 to 35.

6 Claims, 4 Drawing Sheets

(51) Int. Cl.

| | |
|---|---|
| ***C21D 8/00*** | (2006.01) |
| ***C21D 8/12*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/16*** | (2006.01) |
| ***H01F 1/147*** | (2006.01) |
| ***H01F 41/02*** | (2006.01) |

(52) U.S. Cl.

CPC ............ *C22C 38/008* (2013.01); *C22C 38/02* (2013.01); *C22C 38/04* (2013.01); *C22C 38/06* (2013.01); *C22C 38/16* (2013.01); *H01F 1/14775* (2013.01); *H01F 41/02* (2013.01); *C22C 2202/02* (2013.01)

(56) References Cited

U.S. PATENT DOCUMENTS

| | | | | |
|---|---|---|---|---|
| 2018/0230564 | A1* | 8/2018 | Nakajima | C21D 8/12 |
| 2018/0327883 | A1* | 11/2018 | Zaizen | C22C 38/60 |
| 2019/0017136 | A1* | 1/2019 | Lee | C21D 8/1222 |

FOREIGN PATENT DOCUMENTS

| | | | | | |
|---|---|---|---|---|---|
| JP | 3-229822 | A | | 10/1991 | |
| JP | 2003-197414 | A | | 7/2003 | |
| JP | 2004-152791 | A | | 5/2004 | |
| JP | 2018-3049 | A | | 1/2018 | |
| JP | 2018003049 | A | * | 1/2018 | C21D 8/12 |
| JP | 2018-168413 | A | | 11/2018 | |
| JP | 2018-178196 | A | | 11/2018 | |
| WO | WO 03/002777 | A1 | | 1/2003 | |
| WO | WO 2016/136095 | A1 | | 9/2016 | |
| WO | WO 2017/086036 | A1 | | 5/2017 | |

* cited by examiner

NON ORIENTED ELECTRICAL STEEL SHEET AND METHOD FOR PRODUCING THEREOF

TECHNICAL FIELD

The present invention relates to a non oriented electrical steel sheet excellent in magnetic characteristics and punchability, and a method for producing thereof.

BACKGROUND ART

In recent years, especially in the field of electrical equipment such as rotating machines, small and medium-size transformers, and electrical components, it is eagerly demanded for a motor to enhance the efficiency and to reduce the size, due to the movement of global environmental conservation represented by global power reduction, energy saving, and $CO_2$ emission reduction. Under the social situation, it is demanded to improve the performance for the non oriented electrical steel sheet used as motor core materials.

For instance, in the automotive field, the non oriented electrical steel sheet is used as the core of drive motor for hybrid drive vehicles (HEV: Hybrid Electric Vehicle) and the like. Moreover, it is demanded to reduce the size of drive motor used in HEV in order to save installation space and to reduce fuel consumption by weight reduction.

To reduce the size of drive motor, it is necessary to increase the torque of motor. Thus, it is demanded to further improve the magnetic flux density of the non oriented electrical steel sheet. Moreover, since the battery capacity that can be mounted on the automobile is limited, it is needed to reduce the energy loss in the motor. Thus, it is demanded to further decrease the iron loss of the non oriented electrical steel sheet.

In addition, among the motor cores to which the non oriented electrical steel sheet is applied, for instance, there is a "split core". In the split core, the winding is wound around the cores divided into individual teeth, and then the cores are assembled to be the final form of the stator core.

The split core is often applied to a core having a complicated shape, and the shape thereof needs to particularly have high accuracy. However, the electrical steel sheet which is sufficiently heat-treated to coarsen the grains for reducing the iron loss becomes soft, and thereby, the shape accuracy may deteriorate when the member (steel sheet blank) is punched.

For the deterioration of the shape accuracy, for instance, Patent Documents 1 to 3 disclose the technique to improve the punching accuracy by hardening the steel sheet or by refining the grains. However, by the above techniques, the punching accuracy may be improved, but the magnetic characteristics such as magnetic flux density and iron loss may not sufficiently satisfy the demands of recent years.

RELATED ART DOCUMENTS

Patent Documents

[Patent Document 1] PCT International Publication No. WO2003/002777

[Patent Document 2] Japanese Unexamined Patent Application, First Publication No. 2003-197414

[Patent Document 3] Japanese Unexamined Patent Application, First Publication No. 2004-152791

SUMMARY OF INVENTION

Technical Problem to be Solved

In conventional techniques, the technique which simultaneously improves both the punching accuracy and the magnetic characteristics has not been established. If it is possible to simultaneously improve both the punching accuracy and the magnetic characteristics for the non oriented electrical steel sheet used to the split core, it is possible to satisfy the demands for the motor to enhance the efficiency and to reduce the size.

An object of the present invention is to simultaneously improve both the accuracy of punching (punchability) and the magnetic characteristics for the split core. In particular, the object of the present invention is to simultaneously improve both the punchability and the magnetic characteristics in two directions of the rolling direction and the transverse direction for the motor core. Specifically, the object of the present invention is to provide the non oriented electrical steel sheet excellent in the punchability and the magnetic characteristics, and a method for producing thereof.

Solution to Problem

The present inventors have made a thorough investigation to solve the above mentioned situations. As a result, it is found that, when the alignment degree to {5 5 7}<7 14 5> orientation in the central area along the thickness direction of the base steel sheet is made to increase, it is possible to improve both the punchability and the magnetic characteristics.

Moreover, the present inventors have made a thorough investigation about the conditions to make the alignment degree to {5 5 7}<7 14 5> orientation in the central area along the thickness direction increase. As a result, it is found that, when the ratio of recrystallized structure and non-recrystallized structure in the steel sheet before cold rolling is controlled by controlling each process, it is possible to make the alignment degree to {5 5 7}<7 14 5> orientation in the central area along the thickness direction increase after subsequent cold rolling and final annealing.

An aspect of the present invention employs the following.

(1) A non oriented electrical steel sheet according to an aspect of the present invention consists of a silicon steel sheet and an insulation coating, characterized in that the silicon steel sheet contains, as a chemical composition, by mass %, 0.01 to 3.50% of Si,
0.001 to 2.500% of Al,
0.01 to 3.00% of Mn,
0.0030% or less of C,
0.180% or less of P,
0.003% or less of S,
0.003% or less of N,
0.002% or less of B,
0 to 0.05% of Sb,
0 to 0.20% of Sn,
0 to 1.00% of Cu,
0 to 0.0400% of REM,
0 to 0.0400% of Ca,
0 to 0.0400% of Mg, and
a balance consisting of Fe and impurities, and an alignment degree to {5 5 7}<7 14 5> orientation in a central area along a thickness direction of the silicon steel sheet is 12 to 35.

(2) In the non oriented electrical steel according to (1), the silicon steel sheet may contain, as the chemical composition, by mass %, at least one selected from a group consisting of 0.001 to 0.05% of Sb,
0.01 to 0.20% of Sn,
0.10 to 1.00% of Cu,
0.0005 to 0.0400% of REM,
0.0005 to 0.0400% of Ca, and
0.0005 to 0.0400% of Mg.

(3) In the non oriented electrical steel according to (1) or (2), the alignment degree to {5 5 7}<7 14 5> orientation may be 18 to 35.

(4) A method for producing a non oriented electrical steel according to an aspect of the present invention is for producing the non oriented electrical steel according to any one of (1) to (3), and the method may contain a casting process, a hot rolling process, an heat conservation process, a pickling process, a cold rolling process, a final annealing process, and a coating formation process, wherein in the casting process, a slab is cast, the slab containing, as a chemical composition, by mass %,
0.01 to 3.50% of Si,
0.001 to 2.500% of Al,
0.01 to 3.00% of Mn,
0.0030% or less of C,
0.180% or less of P,
0.003% or less of S,
0.003% or less of N,
0.002% or less of B,
0 to 0.05% of Sb,
0 to 0.20% of Sn,
0 to 1.00% of Cu,
0 to 0.0400% of REM,
0 to 0.0400% of Ca,
0 to 0.0400% of Mg, and
a balance consisting of Fe and impurities, in the hot rolling process, a slab heating temperature before hot rolling is 1000 to 1300° C., a finish rolling temperature for final hot rolling is 800 to 950° C., a cumulative reduction of hot rolling is 98 to 99.5%, and an average cooling rate from a temperature after finishing the hot rolling to a heat conservation temperature for heat conservation treatment is 80 to 200° C./second, in the heat conservation process, the heat conservation temperature is 700 to 850° C. and a heat conservation time is 10 to 180 minutes, before the cold rolling process, a fraction of non-recrystallized grains in a steel sheet is controlled to be 10 to 20 area %, in the cold rolling process, a cumulative reduction of cold rolling is 80 to 95%, and in the final annealing process, an average heating rate from a heating start temperature to 750° C. is 5 to 50° C./second, an average heating rate from 750° C. to a holding temperature for final annealing is changed to a heating rate which is faster than the average heating rate to 750° C. and which is within a range of 20 to 100° C./second, and the holding temperature for final annealing is a recrystallization temperature or higher.

Effects of Invention

According to the above aspects of the present invention, it is possible to provide the non oriented electrical steel sheet excellent in both the punchability and the magnetic characteristics in two directions of the rolling direction and the transverse direction for the split core, and the method for producing thereof.

DETAILED DESCRIPTION OF PREFERRED EMBODIMENTS

Hereinafter, a preferable embodiment of the present invention is described in detail. However, the present invention is not limited only to the configuration which is disclosed in the embodiment, and various modifications are possible without departing from the aspect of the present invention. In addition, the limitation range as described below includes a lower limit and an upper limit thereof. However, the value expressed by "more than" or "less than" does not include in the limitation range. "%" of the amount of respective elements expresses "mass %".

Figure 1:
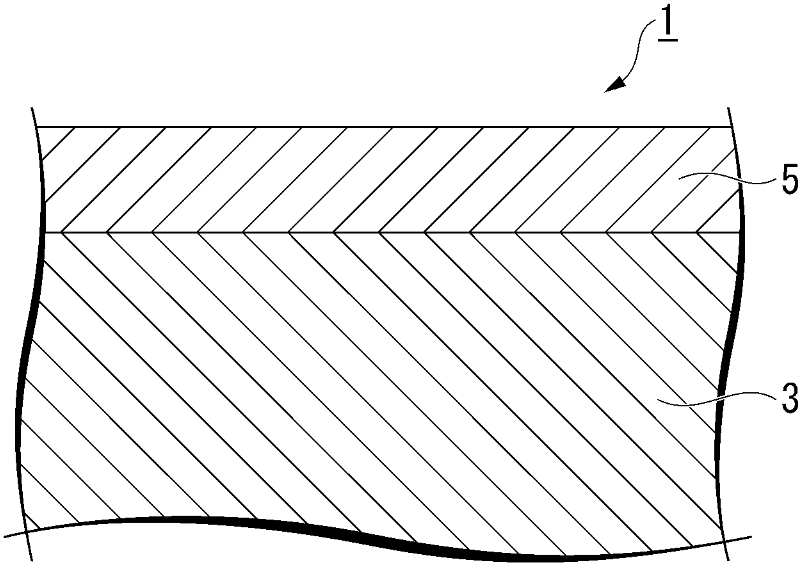
FIG. 1 is a cross sectional illustration of a non oriented electrical steel sheet according to an embodiment of the present invention.

A non oriented electrical steel sheet according to the embodiment includes a silicon steel sheet as base steel sheet and an insulation coating. FIG. 1 is a cross sectional illustration of the non oriented electrical steel sheet according to the embodiment. The non oriented electrical steel sheet 1 according to the embodiment includes the silicon steel sheet 3 and the insulation coating 5 when viewing a cross section whose cutting direction is parallel to a thickness direction. In addition, in the embodiment, the alignment degree to {5 5 7}<7 14 5> orientation in the central area along the thickness direction of the silicon steel sheet is 12 or more.

(Texture of Silicon Steel Sheet)

In the embodiment, it is needed to control the alignment degree to {5 5 7}<7 14 5> orientation in the central area along the thickness direction of the silicon steel sheet to be 12 or more.

In the embodiment, for instance, the {1 1 1}<1 1 2> orientation, the {5 5 7}<7 14 5> orientation, and the like correspond to the orientation including orientations within ±5°, regarding the miller index of the direction perpendicular to rolled surface (normal direction) and the miller index of the direction parallel to the rolling direction (in-plane direction).

The {5 5 7}<7 14 5> orientation is the orientation relatively close to the {1 1 1} orientation which is favorable for improving the punching accuracy. Also, the {5 5 7}<7 14 5> orientation is the orientation relatively close to the {4 1 1}<1 4 8> orientation which is favorable for improving the magnetic characteristics. Therefore, when the alignment degree to {5 5 7}<7 14 5> orientation in the central area along the thickness direction of the silicon steel sheet to increase, it is possible to improve both the punchability and the magnetic characteristics.

When the alignment degree to {5 5 7}<7 14 5> orientation is 12 or more, it is possible to improve both the punchability and the magnetic characteristics. The alignment degree to {5 5 7}<7 14 5> orientation is preferably 15 or more, and more preferably 18 or more. On the other hand, since it is preferable that the alignment degree to {5 5 7}<7 14 5> orientation is as high as possible, the upper limit thereof is not particularly limited. However, since it is substantially difficult to control the alignment degree to {5 5 7}<7 14 5> orientation to be more than 35, the upper limit thereof may be 35 or less. The upper limit thereof may be 30 or less, and may be 25 or less.

The control for making the alignment degree to {5 5 7}<7 14 5> orientation in the central area along the thickness direction of the silicon steel sheet increase is explained below.

The alignment degree of crystal orientation may be measured by the following method. When t is the thickness of the silicon steel sheet, the central area is regarded as the position of ½ t from the surface of silicon steel sheet along the thickness direction. A sample with approximately 30 mm×30 mm is cut out from the steel sheet, the sheet surface of the sample is mechanically polished to reduce the thickness of the sample, and thereby the central area is exposed. The exposed surface is chemical-polished or electrolytic-polished to remove the strain, and thereby the measurement sample is obtained.

X-ray diffraction is conducted using the measurement sample, and the pole figures of {2 0 0} plane, {1 1 0} plane, and {2 1 1} plane are obtained. From the above pole figures, the orientation determination function ODF of the central area is obtained. Based on the orientation determination function, the alignment degree to {5 5 7}<7 14 5> orientation is obtained.

(Chemical Composition of Silicon Steel Sheet)

In the embodiment, the silicon steel sheet contains, as a chemical composition, base elements, optional elements as necessary, and a balance consisting of Fe and impurities. "%" related to the chemical composition expresses "mass %".

In the embodiment, Si, Al, and Mn are the base elements (main alloying elements) in the chemical composition of the silicon steel sheet.

0.01 to 3.50% of Si

Si (silicon) is an element which decreases the magnetic flux density, decreases workability during production by hardening the steel sheet, and decreases the punchability. On the other hand, Si is the element which reduces eddy current loss by increasing the electrical resistance of steel sheet, and thereby reduces the iron loss.

When the Si content is more than 3.50%, the magnetic flux density and the punchability deteriorate excessively, and the production cost increases. Thus, the Si content is to be 3.50% or less. The Si content is preferably 3.20% or less, and more preferably 3.00% or less. On the other hand, when the Si content is less than 0.01%, the electrical resistance of steel sheet does not increase, and the iron loss is not reduced. Thus, the Si content is to be 0.01% or more. The Si content is preferably 0.10% or more, more preferably 0.50% or more, further more preferably more than 2.00%, further more preferably 2.10% or more, and further more preferably 2.30% or more.

0.001 to 2.500% of Al

Al (aluminum) is an element which is unavoidably contained in ores and refractories, and is also used for deoxidation. In common with Si, Al (aluminum) is the element which has the effect of reducing the eddy current loss by increasing the electrical resistance, and thereby reducing the iron loss.

When the Al content is less than 0.001%, the deoxidation becomes insufficient, the electrical resistance of steel sheet does not increase, and the iron loss is not reduced. Thus, the Al content is to be 0.001% or more. The Al content is preferably 0.010% or more, more preferably 0.050% or more, further more preferably more than 0.50%, and further more preferably 0.60% or more.

On the other hand, when the Al content is more than 2.500%, the magnetic flux density decreases because the saturation magnetic flux density decreases. Thus, the Al content is to be 2.500% or less. The Al content is preferably 2.000% or less, and more preferably 1.600% or less.

0.01 to 3.00% of Mn

Mn (manganese) is an element which has the effect of reducing the eddy current loss by increasing the electrical resistance and of suppressing the formation of {111}<112> texture which is undesirable for magnetic characteristics.

When the Mn content is less than 0.01%, the addition effect is not sufficiently obtained. Thus, the Mn content is to be 0.01% or more. The Mn content is preferably 0.15% or more, more preferably 0.40% or more, further more preferably more than 0.60%, and further more preferably 0.70% or more. On the other hand, when the Mn content is more than 3.00%, the grain growth during annealing is suppressed, and the iron loss deteriorates. Thus, the Mn content is to be 3.00% or less. The Mn content is preferably 2.50% or less, and more preferably 2.00% or less.

In the embodiment, the silicon steel sheet contains the impurities as the chemical composition. The impurities correspond to elements which are contaminated during industrial production of steel from ores and scrap that are used as a raw material of steel, or from environment of a production process. For instance, the impurities are elements such as C, P, S, N, and B. It is preferable that the impurities are limited as follows in order to sufficiently obtain the effects of the embodiment. Moreover, since it is preferable that the amount of respective impurities is low, a lower limit of the respective impurities does not need to be limited, and the lower limit may be 0%.

0.0030% or less of C

C (carbon) is an impurity element which causes the deterioration of the iron loss and the magnetic aging. It is preferable that the C content is as low as possible, and thus, the C content is to be 0.0030% or less. The C content is preferably 0.0025% or less, and more preferably 0.0020% or less. The lower limit of the C content is not particularly limited. In consideration of industrial purification technology, the lower limit thereof may be 0.0001% practically. In consideration of producing cost, the lower limit thereof is preferably 0.0005% or more.

0.180% or less of P

Although P (phosphorus) may contribute to the improvement of the tensile strength without decreasing the magnetic flux density, P is an impurity element which embrittles the steel sheet. When the P content is more than 0.180%, the toughness deteriorates, and the steel sheet tends to be fractured. Thus, the P content is to be 0.180% or less.

It is preferable that the P content is as low as possible in order to suppress the fracture of steel sheet. The P content is preferably 0.150% or less, and more preferably 0.120% or less. The lower limit of the P content is not particularly limited. In consideration of industrial purification technology, the lower limit thereof may be 0.0001% practically. In consideration of producing cost, the lower limit thereof is preferably 0.001%.

0.003% or less of S

S (sulfur) is an impurity element which forms fine sulfides such as MnS, and thus, suppresses the recrystallization and the grain growth during final annealing. When the S content is more than 0.003%, the recrystallization and the grain growth during final annealing are suppressed significantly. Thus, the S content is to be 0.003% or less. It is preferable that the S content is as low as possible. The S content is preferably 0.002% or less, and more preferably 0.001% or less.

The lower limit of the S content is not particularly limited. In consideration of industrial purification technology, the lower limit thereof may be 0.0001% practically. In consideration of producing cost, the lower limit thereof is preferably 0.0005%.

0.003% or less of N

N (nitrogen) is an impurity element which deteriorates the iron loss by forming precipitates. When the N content is more than 0.003%, the iron loss deteriorates excessively. Thus, the N content is to be 0.003% or less. The N content is preferably 0.002% or less, and more preferably 0.001% or less. The lower limit of the N content is not particularly limited. In consideration of industrial purification technology, the lower limit thereof may be 0.0001% practically. In consideration of producing cost, the lower limit thereof is preferably 0.0005%.

0.002% or less of B

B (boron) is an impurity element which deteriorates the iron loss by forming precipitates. When the B content is more than 0.002%, the iron loss deteriorates excessively. Thus, the B content is to be 0.002% or less. The B content is preferably 0.001% or less, and more preferably 0.0005% or less. The lower limit of the B content is not particularly limited. In consideration of industrial purification technology, the lower limit thereof may be 0.0001% practically. In consideration of producing cost, the lower limit thereof is preferably 0.0005%.

In the embodiment, the silicon steel sheet may contain the optional element in addition to the base elements and the impurities described above. For instance, as substitution for a part of Fe which is the balance described above, as the optional element, the steel sheet may contain Sb, Sn, Cu, REM, Ca, and Mg. The optional elements may be contained as necessary. Thus, a lower limit of the optional element does not need to be limited, and the lower limit may be 0%. Moreover, even if the optional element may be contained as impurities, the above mentioned effects are not affected.

0 to 0.05% of Sb

Sb (antimony) is an element which suppresses the surface nitridation of steel sheet, and contributes to the improvement of iron loss. When the Sb content is more than 0.05%, the toughness of steel deteriorates. Thus, the Sb content is to be 0.05% or less. The Sb content is preferably 0.03% or less, and more preferably 0.01% or less. The lower limit of the Sb content is not particularly limited, and may be 0%. The Sb content may be 0.001% or more in order to obtain the above effects preferably.

0 to 0.20% of Sn

Sn (tin) is an element which suppresses the surface nitridation of steel sheet, and contributes to the improvement of iron loss. When the Sn content is more than 0.20%, the toughness of steel deteriorates, and the insulation coating tends to be delaminated. Thus, the Sn content is to be 0.20% or less. The Sn content is preferably 0.15% or less, and more preferably 0.10% or less. The lower limit of the Sn content is not particularly limited, and may be 0%. The Sn content may be 0.01% or more in order to obtain the above effects preferably. The Sn content is preferably 0.04% or more, and more preferably 0.08% or more.

0 to 1.00% of Cu

Cu (copper) is the element which has the effects of suppressing the formation of {111}<112> texture which is undesirable for magnetic characteristics, of suppressing the oxidation of steel sheet surface, and of controlling the grain growth to be uniform. When the Cu content exceeds 1.00%, the effects of addition are saturated, the grain growth during final annealing is suppressed, the workability of steel sheet deteriorates, and the steel sheet becomes brittle during cold rolling. Thus, the Cu content is to be 1.00% or less. The Cu content is preferably 0.60% or less and more preferably 0.40% or less. The lower limit of Cu content is not particularly limited, and may be 0%. The Cu content may be 0.10% or more in order to obtain the above effects preferably. The Cu content is preferably 0.20% or more and more preferably 0.30% or more.

0 to 0.0400% of REM 0 to 0.0400% of Ca 0 to 0.0400% of Mg

REM (Rare Earth Metal), Ca (calcium), and Mg (magnesium) are the elements which have the effects of fixing S as sulfides or oxysulfides, of suppressing the fine precipitation of MnS and the like, and of promoting the recrystallization and grain growth during final annealing.

When REM, Ca, and Mg exceed 0.0400%, the sulfides or oxysulfides are excessively formed, and the recrystallization and grain growth during final annealing are suppressed. Thus, the REM content, the Ca content, and the Mg content are to be 0.0400% or less respectively. The respective contents are preferably 0.0300% or less and more preferably 0.0200% or less.

The lower limits of REM content, Ca content, and Mg content are not particularly limited, and may be 0%. The REM content, the Ca content, and the Mg content may be 0.0005% or more in order to obtain the above effects preferably. The respective contents are preferably 0.0010% or more and more preferably 0.0050% or more.

Herein, REM indicates a total of 17 elements of Sc, Y and lanthanoid, and is at least one of them. The above REM content corresponds to the total content of at least one of these elements. Industrially, misch metal is added as the lanthanoid.

In the embodiment, it is preferable that the silicon steel sheet contains, as the chemical composition, by mass %, at least one selected from the group consisting of 0.001 to 0.05% of Sb, 0.01 to 0.20% of Sn, 0.10 to 1.00% of Cu, 0.0005 to 0.0400% of REM, 0.0005 to 0.0400% of Ca, or 0.0005 to 0.0400% of Mg.

The steel composition as described above may be measured by typical analytical methods for steel. For instance, the steel composition may be measured by using ICP-AES (Inductively Coupled Plasma-Atomic Emission Spectrometer: inductively coupled plasma emission spectroscopy spectrometry). In addition, C and S may be measured by the infrared absorption method after combustion, N may be measured by the thermal conductometric method after fusion in a current of inert gas, and O may be measured by, for instance, the non-dispersive infrared absorption method after fusion in a current of inert gas.

The above chemical composition is that of the silicon steel sheet. When the non oriented electrical steel sheet to be the measurement sample has the insulation coating and the like on the surface, the above chemical composition is obtained after removing the coating.

As a method for removing the insulation coating and the like of the non oriented electrical steel sheet, for instance, the following method is exemplified. First, the non oriented electrical steel sheet having the insulation coating and the like is immersed in sodium hydroxide aqueous solution, sulfuric acid aqueous solution, and nitric acid aqueous solution in this order. The steel sheet after the immersion is washed. Finally, the steel sheet is dried with warm air. Thereby, it is possible to obtain the silicon steel sheet from which the insulation coating is removed.

(Magnetic Characteristics of Electrical Steel Sheet)

It is preferable that the non oriented electrical steel sheet according to the embodiment shows excellent magnetic characteristics in regard to the two directions which are the rolling direction and the transverse direction (the direction perpendicular to the rolling direction) for the split core. Thus, when the magnetic flux density $B_{50}$ is defined as the average of the magnetic flux density in rolling direction and the magnetic flux density in transverse direction under conditions such that the steel sheet is excited under magnetic field strength of 5000 A/m, and when the saturation magnetic flux density $B_S$ is defined as the average of the saturation magnetic flux density of rolling direction and the saturation magnetic flux density of transverse direction, it is preferable that the ratio $B_{50}/B_S$ of the magnetic flux density $B_{50}$ to the saturation magnetic flux density $B_S$ is 0.82 or more.

The ratio $B_{50}/B_S$ is preferably 0.84 or more, more preferably 0.86 or more, and further more preferably 0.90 or more. On the other hand, since the saturation magnetic flux density $B_S$ is the maximum magnetic flux density obtained when the maximum magnetic field is applied, the maximum of the ratio $B_{50}/B_S$ is 1. The upper limit of the ratio $B_{50}/B_S$ is not particularly limited, and may be 1.00. The ratio $B_{50}/B_S$ is preferably 0.98 or less.

The {5 5 7}<7 14 5> orientation which is controlled in the embodiment is the orientation relatively close to the {4 1 1}<1 4 8> orientation, and the {4 1 1}<1 4 8> orientation is the orientation relatively close to the {1 0 0}<0 1 2> orientation which improves the magnetic flux density $B_{50}$ of the rolling direction and the transverse direction. Thus, it seems that the magnetic characteristics in two directions of the rolling direction and the transverse direction are improved in the embodiment.

The magnetic characteristics of electrical steel sheet may be measured by, for instance, the single sheet tester (SST). Specifically, the magnetic flux density $B_{50}$ may be obtained by measuring the magnetic flux densities in the unit of T (tesla) in the rolling direction and in the transverse direction when the steel sheet is excited under the magnetic field strength of 5000 A/m. In the same way, the saturation magnetic flux density $B_S$ may be obtained by measuring the magnetic flux densities in the unit of T (tesla) in the rolling direction and in the transverse direction when the steel sheet is excited under the maximum magnetic field.

(Punchability of Electrical Steel Sheet)

In the non oriented electrical steel sheet according to the embodiment, the alignment degree to {5 5 7}<7 14 5> orientation is made to increase, and thereby, the punching accuracy is improved. For instance, when the circular punching is conducted, the roundness of the punched piece is improved.

Herein, the roundness may be evaluated by the difference between the maximum radius and the minimum radius of the circular punched piece. For instance, the circular piece with the radius of 200 mm is punched, the maximum radius and the minimum radius of the punched piece is measured, and then, the difference may be evaluated.

In the embodiment, the roundness is preferably 45 μm or less, and more preferably 40 μm or less. On the other hand, the lower limit of the roundness is not particularly limited. However, since it is substantially difficult to control the roundness to be less than 5 μm, the lower limit thereof may be 5 μm.

As explained above, in the embodiment, the alignment degree to {5 5 7}<7 14 5> orientation in the central area along the thickness direction is made to increase as compared with the conventional steel sheet, and thereby, the punchability is improved. The mechanism for improving the punchability is considered as follows.

The {5 5 7}<7 14 5> orientation which is controlled in the embodiment is the orientation relatively close to the {1 1 1}<1 1 2> orientation. In the {1 1 1} orientation, the hardness anisotropy in the whole circumferential direction is small, and thus, the deformation where the steel sheet is stretched by punching is substantially equal over the whole circumferential direction. Therefore, it is considered that, when the alignment degree to {5 5 7}<7 14 5> orientation is made to increase, the punchability is improved.

(Other Features of Electrical Steel Sheet)

The thickness of silicon steel sheet may be appropriately adjusted depending on the intended use and the like, and is not particularly limited. From a production standpoint, the thickness of silicon steel sheet is preferably 0.10 mm or more, and more preferably 0.15 mm or more. On the other hand, the thickness of silicon steel sheet is preferably 0.50 mm or less, and more preferably 0.35 mm or less.

The non oriented electrical steel sheet according to the embodiment may have an insulation coating on the surface of silicon steel sheet. The type of insulation coating is not particularly limited, and may be selected depending on the intended use and the like from the known coating.

For instance, the insulation coating may be either an organic coating or an inorganic coating. Examples of the organic coating include: polyamine resins; acrylic resins; acrylic styrene resins; alkyd resins; polyester resins; silicone resins; fluorocarbon resins; polyolefin resins; styrene resins; vinyl acetate resins; epoxy resins; phenolic resins; urethane resins; melamine resins; and the like.

Examples of the inorganic coating include: phosphate-based coatings; aluminum phosphate-based coatings; and the like. Moreover, an organic-inorganic composite coating containing the above-mentioned resin is included. The thickness of insulation coating is not particularly limited, and is preferably 0.05 to 2 μm as an average thickness per one side.

Next, a producing method for the non oriented electrical steel sheet according to the embodiment is explained.

Figure 2:
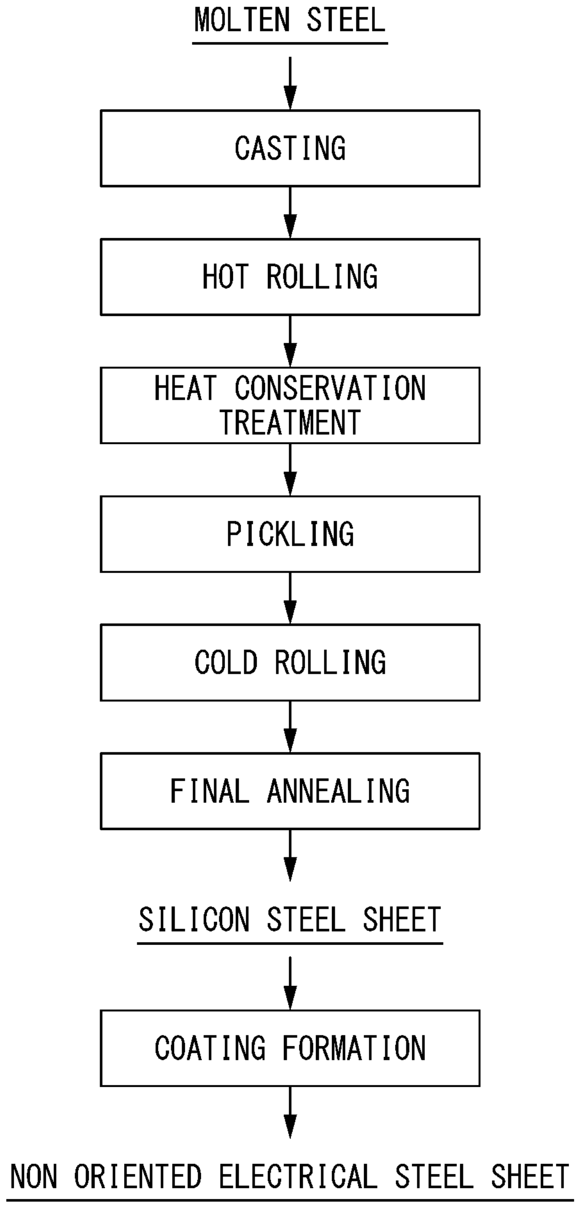
FIG. 2 is a flow chart illustrating a producing method for the non oriented electrical steel sheet according to the embodiment.

FIG. 2 is a flow chart illustrating a producing method for the non oriented electrical steel sheet according to the embodiment. In the embodiment, the silicon steel sheet is obtained by casting molten steel with an adjusted composition, by being hot-rolled, by being heat-conservation-treated during cooling after hot rolling, by being pickled, by being cold-rolled, and then by being final-annealed. Further, the non oriented electrical steel sheet is obtained by forming the insulation coating on the silicon steel sheet.

In the embodiment, the ratio of recrystallized structure and non-recrystallized structure in the steel sheet before cold rolling (fraction of non-recrystallized grains) is controlled by controlling each process, and then, the alignment degree to {5 5 7}<7 14 5> orientation in the central area along the thickness direction of the silicon steel sheet is made to increase by controlling cold rolling and final annealing.

For instance, the fraction of non-recrystallized grains before cold rolling is not the technical feature which can be controlled by one condition in one process, but is the technical feature which can be controlled by each condition of each process which is comprehensively influenced each other. The conditions are steel composition, temperature of hot rolling, reduction of hot rolling, cooling conditions after hot rolling, and the like.

Specifically, the Si content of steel composition is the factor which influences whether the constituent phase of the steel structure becomes the α phase and/or the γ phase at the hot rolling temperature. When the Si content becomes higher within the range of 0.01 to 3.50%, the fraction of non-recrystallized grains before cold rolling becomes larger.

The Al content of steel composition is the factor which influences whether the constituent phase of the steel structure becomes the α phase and/or the γ phase at the hot rolling temperature. When the Al content becomes higher within the range of 0.001 to 2.500%, the fraction of non-recrystallized grains before cold rolling becomes larger.

The Mn content of steel composition is the factor which influences the amount of formed MnS influencing the driving force of recrystallization. When the Mn content becomes higher within the range of 0.01 to 3.00%, the fraction of non-recrystallized grains before cold rolling becomes larger.

The temperature of hot rolling, specifically the slab heating temperature before hot rolling, is the factor which influences whether the constituent phase of the steel structure becomes the α phase and/or the γ phase, and the factor which influences the deformed structure formed by hot rolling. When the slab heating temperature before hot rolling becomes higher within the range of 1000 to 1300° C., the fraction of non-recrystallized grains before cold rolling becomes larger.

The temperature of hot rolling, specifically the finish rolling temperature for final hot rolling, is the factor which influences whether the constituent phase of the steel structure becomes the α phase and/or the γ phase, and the factor which influences the deformed structure formed by hot rolling. When the finish rolling temperature for final hot rolling becomes higher within the range of 800 to 950° C., the fraction of non-recrystallized grains before cold rolling becomes smaller.

The reduction of hot rolling is the factor which influences the deformed structure formed by hot rolling. When the cumulative reduction of hot rolling becomes larger within the range of 98 to 99.5%, the fraction of non-recrystallized grains before cold rolling becomes smaller.

The cooling conditions after hot rolling, specifically the cooling rate from the temperature after finishing the hot rolling to the heat conservation temperature for heat conservation treatment is the factor which influences the recovery and the recrystallization of the deformed structure formed by hot rolling. When the average cooling rate in the above temperature range becomes faster within the range of 80 to 200° C./second, the fraction of non-recrystallized grains before cold rolling becomes larger.

The cooling conditions after hot rolling, specifically the heat conservation temperature for heat conservation treatment is also the factor which influences the recovery and the recrystallization of the deformed structure formed by hot rolling. When the heat conservation temperature for heat conservation treatment becomes higher within the range of 700 to 850° C., the fraction of non-recrystallized grains before cold rolling becomes smaller.

The cooling conditions after hot rolling, specifically the heat conservation time for heat conservation treatment is also the factor which influences the recovery and the recrystallization of the deformed structure formed by hot rolling. When the heat conservation time for heat conservation treatment becomes longer within the range of 10 to 180 minutes, the fraction of non-recrystallized grains before cold rolling becomes smaller.

In the embodiment, the steel structure is elaborated by purposely, comprehensively, and inseparably controlling each condition explained above, in order to control the fraction of non-recrystallized grains before cold rolling to be 1/10 to 1/5 in the microstructure, specifically to be 10 to 20 area %.

Next, the steel sheet in which the fraction of non-recrystallized grains before cold rolling is controlled is subjected to cold rolling and final annealing, in order to control the {5 5 7}<7 14 5> oriented grains to be preferentially recrystallized.

For instance, the alignment degree to {5 5 7}<7 14 5> orientation is not the technical feature which can be controlled by one condition in one process, but is the technical feature which can be controlled by each condition of each process which is comprehensively influenced each other. The conditions are the fraction of non-recrystallized grains before cold rolling, reduction of cold rolling, heating rate of final annealing, and the like.

Specifically, the reduction of cold rolling is the factor which influences the deformed structure formed by cold rolling. The deformed structure formed by cold rolling becomes the base structure where the {5 5 7}<7 14 5> oriented grains are to be recrystallized. When the cumulative reduction of cold rolling becomes larger within the range of 80 to 95%, the alignment degree to {5 5 7}<7 14 5> orientation becomes smaller.

The heating rate of final annealing, specifically the heating rate from the heating start temperature to 750° C. is the factor which influences the formation of recrystallization nucleus of the {5 5 7}<7 14 5> oriented grains. When the average heating rate in the above temperature range is close to the median in the range of 5 to 50° C./second, the alignment degree to {5 5 7}<7 14 5> orientation becomes larger.

The heating rate of final annealing, specifically the heating rate from 750° C. to the holding temperature for final annealing is the factor which influences the grain growth of the {5 5 7}<7 14 5> oriented grains. When the average heating rate in the above temperature range becomes faster within the range of 20 to 100° C./second, the alignment degree to {5 5 7}<7 14 5> orientation becomes larger.

In the embodiment, the steel structure is elaborated by purposely, comprehensively, and inseparably controlling each condition explained above, in order to control the alignment degree to {5 5 7}<7 14 5> orientation in the central area along the thickness direction of the silicon steel sheet to be 12 to 35.

As explained above, the alignment degree to {5 5 7}<7 14 5> orientation is not the technical feature which can be controlled by one condition in one process. The alignment degree to {5 5 7}<7 14 5> orientation is the technical feature which can be elaborated only by controlling the conditions of cold rolling and final annealing in addition to controlling the fraction of non-recrystallized grains before cold rolling.

Specifically, the producing method for the non oriented electrical steel sheet according to the embodiment includes a casting process, a hot rolling process, an heat conservation process, a pickling process, a cold rolling process, a final annealing process, and a coating formation process, wherein in the casting process, a slab is cast, the slab including, as a chemical composition, by mass %, 0.01 to 3.50% of Si,
0.001 to 2.500% of Al,
0.01 to 3.00% of Mn,
0.0030% or less of C,
0.180% or less of P,
0.003% or less of S,
0.003% or less of N,
0.002% or less of B,
0 to 0.05% of Sb,
0 to 0.20% of Sn,
0 to 1.00% of Cu,
0 to 0.0400% of REM,
0 to 0.0400% of Ca,
0 to 0.0400% of Mg, and
a balance consisting of Fe and impurities, in the hot rolling process, a slab heating temperature before hot rolling is 1000 to 1300° C., a finish rolling temperature for final hot rolling is 800 to 950° C., a cumulative reduction of hot rolling is 98 to 99.5%, and an average cooling rate from a temperature after finishing the hot rolling to a heat conservation temperature for heat conservation treatment is 80 to 200° C./second, in the heat conservation process, the heat conservation temperature is 700 to 850° C. and a heat conservation time is 10 to 180 minutes, a fraction of non-recrystallized grains in a steel sheet before the cold rolling process is controlled to be 10 to 20 area %, in the cold rolling process, a cumulative reduction of cold rolling is 80 to 95%, and in the final annealing process, an average heating rate from a heating start temperature to 750° C. is 5 to 50° C./second, an average heating rate from 750° C. to a holding temperature for final annealing is changed to a heating rate which is faster than the average heating rate to 750° C. and which is within a range of 20 to 100° C./second, and the holding temperature for final annealing is a recrystallization temperature or higher.

Hereinafter, as the favorable producing method, the processes will be described in order form the casting process.

(Casting Process)

In the casting process, the molten steel with predetermined chemical composition may be made by a converter or an electric furnace, and the slab may be made by using the molten steel. The slab may be made by continuous casting. The ingot may be made by using the molten steel, and then, the slab may be made by blooming the ingot. The slab may be made by other methods. The thickness of the slab is not particularly limited. The thickness of the slab may be 150 to 350 mm for instance. The thickness of the slab is preferably 220 to 280 mm. The slab with the thickness of 10 to 70 mm which is a so-called thin slab may be used.

In the casting process, in order to control the fraction of non-recrystallized grains in the steel sheet before cold rolling to be 10 to 20 area %, the Si content of steel composition is controlled to be within the range of 0.01 to 3.50%, the Al content is controlled to be within the range of 0.001 to 2.500%, and the Mn content is controlled to be within the range of 0.01 to 3.00%.

The Si content is preferably 0.10% or more, more preferably 0.50% or more, further more preferably more than 2.00%, further more preferably 2.10% or more, and further more preferably 2.30% or more. The Si content is preferably 3.20% or less, and more preferably 3.00% or less. The Al content is preferably 0.010% or more, more preferably 0.050% or more, further more preferably more than 0.50%, and further more preferably 0.60% or more. The Al content is preferably 2.000% or less, and more preferably 1.600% or less. The Mn content is preferably 0.15% or more, more preferably 0.40% or more, further more preferably more than 0.60%, and further more preferably 0.70% or more. The Mn content is preferably 2.50% or less, and more preferably 2.00% or less.

(Hot Rolling Process)

In the hot rolling process, the slab may be hot-rolled by a hot rolling mill. The hot rolling mill includes, for instance, a rough rolling mill and a final rolling mill which is arranged downstream of the rough rolling mill. The heated steel piece is rolled by the rough rolling mill and then by the final rolling mill, and thereby, the hot rolled steel sheet is obtained.

In the hot rolling process, in order to control the fraction of non-recrystallized grains in the steel sheet before cold rolling to be 10 to 20 area %, the slab heating temperature before hot rolling is controlled to be within the range of 1000 to 1300° C., the finish rolling temperature for final hot rolling is controlled to be within the range of 800 to 950° C., the cumulative reduction of hot rolling is controlled to be within the range of 98 to 99.5%, and the average cooling rate from the temperature after finishing the hot rolling to the heat conservation temperature for heat conservation treatment is controlled to be within the range of 80 to 200° C./second.

The slab heating temperature is preferably 1100° C. or more, and more preferably 1150° C. or more. The slab heating temperature is preferably 1250° C. or less, and more preferably 1200° C. or less. The finish rolling temperature is preferably 850° C. or more. The finish rolling temperature is preferably 900° C. or less. The average cooling rate is preferably 100° C./second or more, and more preferably 120° C./second or more. The average cooling rate is preferably 180° C./second or less, and more preferably 150° C./second or less.

Herein, when the final hot rolling is started, the thickness of the steel sheet is preferably 20 to 100 mm. Moreover, the cumulative reduction of hot rolling is defined as follows.

Cumulative reduction (%)=(1−Thickness of steel sheet after hot rolling/Thickness of steel sheet before hot rolling)×100

(Heat Conservation Process)

In the heat conservation process, the hot rolled steel sheet is heat-conservation-treated during cooling after hot rolling. In the heat conservation process, in order to control the fraction of non-recrystallized grains in the steel sheet before cold rolling to be 10 to 20 area %, the heat conservation temperature is controlled to be within the range of 700 to 850° C. and a heat conservation time is controlled to be within the range of 10 to 180 minutes.

The heat conservation temperature is preferably 750° C. or more, and more preferably 780° C. or more. The heat conservation temperature is preferably 830° C. or less, and more preferably 800° C. or less. The heat conservation time is preferably 20 minutes or more, more preferably 30 minutes or more, and further more preferably 40 minutes or more. The heat conservation time is preferably 150 minutes or less, more preferably 120 minutes or less, and further more preferably 100 minutes or less.

(Pickling Process)

In the pickling process, the pickling may be conducted in order to remove the scale formed on the surface of hot rolled steel sheet. The conditions for pickling the hot rolled steel sheet are not particularly limited, and known conditions may be appropriately applied.

(Steel Sheet before Cold Rolling Process)

In the embodiment, with respect to the microstructure of the steel sheet which is after the casting process, the hot rolling process, the heat conservation process, and the pickling process and which is before the cold rolling process, the fraction of non-recrystallized grains in the microstructure is controlled to be 10 to 20 area %.

One of main orientation of the conventional non oriented electrical steel sheet is the {1 1 1}<1 1 2> orientation. In general, the microstructure of the steel sheet before cold rolling is made to be entirely recrystallized, the strain is accumulated into the microstructure by cold rolling, the recrystallization nucleus are made to be formed and grown from grain boundaries during final rolling, and thereby, the grains having the above orientation are formed. On the other hand, in the embodiment, the predetermined amount of the non-recrystallized grains is made to remain in the microstructure of the steel sheet before cold rolling, the conditions of cold rolling and the conditions of final annealing are favorably controlled, and thereby, the grains having the {5 5 7}<7 14 5> orientation are purposely formed.

When the above fraction of non-recrystallized grains does not satisfy 10 to 20 area %, the alignment degree to {5 5 7}<7 14 5> orientation is difficult to be eventually controlled. Moreover, when the excessive amount of the non-recrystallized grains is included in the microstructure of the steel sheet before cold rolling, the grains having the {4 1 1}<1 4 8> orientation which are effective for improving the magnetic characteristics are difficult to be formed in the microstructure after final annealing. Thus, in order to favorably improve both the magnetic characteristics and the punchability, it is optimal to control the fraction of non-recrystallized grains in the steel sheet before the cold rolling process to be 10 to 20 area %.

In conventional technique, the hot rolled steel sheet after hot rolling is cooled to near room temperature, and thereafter, the hot rolled steel sheet annealing is conducted under conditions such that the holding temperature is 800 to 1050° C. and the holding time is 1 minutes or less by reheating the steel sheet. However, in case of the hot rolled steel sheet annealing, it is difficult to elaborate the recrystallized structure and the non-recrystallized structure which satisfy the above ratio in the microstructure of the steel sheet before cold rolling.

In the embodiment, in order to control the fraction of non-recrystallized grains in the steel sheet before cold rolling, the steel sheet is subjected to the above heat conservation treatment during cooling after hot rolling. Moreover, the steel sheet after heat conservation treatment is cooled to near room temperature, and thereafter, the hot rolled steel sheet annealing is not conducted. As a result, the fraction of non-recrystallized grains in the steel sheet before cold rolling is favorably controlled, and thus, it is possible to eventually increase the alignment degree to {5 5 7}<7 14 5> orientation in the central area along the thickness direction of the steel sheet.

The fraction of non-recrystallized grains in the steel sheet before cold rolling may be measured by the following method. A sample with approximately 25 mm×25 mm is cut out from the steel sheet before cold rolling, the sheet surface of the sample is mechanical-polished, and thereby, the thickness of the steel sheet is reduced to ½. The polished surface is chemical-polished or electrolytic-polished, and thereby, the measurement sample without strain is obtained.

The fraction of non-recrystallized grains in the observed visual field may be obtained from KAM value (Kernel Average Misorientation) by conducting EBSD (Electron Back Scattering Diffraction) for the measurement sample. For instance, the grain whose KAM value is 2.0 or more is regarded as the non-recrystallized grains in the observed visual field. The EBSD measurements may be conducted on ten places or more while changing the observed visual field, and the total area of the observed visual fields may be 1000000 $\mu m^2$ or more.

As explained above, in the embodiment, it is preferable that the hot rolled steel sheet annealing is not conducted between the hot rolling process and the cold rolling process. Specifically, in the embodiment, it is preferable that the hot rolling process, the heat conservation process, the pickling process, and the cold rolling process are continuous processes. In other words, it is preferable that the steel sheet after the hot rolling process is subjected to the heat conservation treatment, the steel sheet after the heat conservation process is subjected to the pickling, and the steel sheet after the pickling process is subjected to the cold rolling.

(Cold Rolling Process)

In the cold rolling process, the steel sheet in which the fraction of non-recrystallized grains is controlled to be 10 to 20 area % is cold-rolled. In the cold rolling process, in order to control the alignment degree to {5 5 7}<7 14 5> orientation to be 12 to 35 after final annealing, the cumulative reduction of cold rolling is controlled to be within the range of 80 to 95%. The cumulative reduction is preferably 83% or more, and more preferably 85% or more.

The cumulative reduction of cold rolling is defined as follows.

$$\text{Cumulative reduction (\%)}=(1-\text{Thickness of steel sheet after cold rolling}/\text{Thickness of steel sheet before cold rolling})\times 100$$

(Final Annealing Process)

In the final annealing process, the cold rolled steel sheet is final-annealed. In the final annealing process, in order to control the alignment degree to {5 5 7}<7 14 5> orientation to be 12 to 35 after final annealing, the average heating rate from the heating start temperature to 750° C. is controlled to be within the range of 5 to 50° C./second, the average heating rate from 750° C. to the holding temperature for final annealing is changed to the heating rate which is faster than the average heating rate to 750° C. and is controlled to be within the range of 20 to 100° C./second, and the holding temperature for final annealing is controlled to be the recrystallization temperature or higher.

The average heating rate to 750° C. is preferably 10° C./second or more, and more preferably 20° C./second or more. The average heating rate to 750° C. is preferably 40° C./second or less, and more preferably 30° C./second or less. The average heating rate from 750° C. is preferably 30° C./second or more, and more preferably 40° C./second or more. The average heating rate from 750° C. is preferably 80° C./second or less, and more preferably 60° C./second or less.

The holding temperature for final annealing is preferably 800 to 1200° C. The holding temperature is preferably 850° C. or more. The holding time is preferably 5 to 120 seconds. The holding time is preferably 10 seconds or more, and more preferably 20 seconds or more.

The alignment degree to {5 5 7}<7 14 5> orientation in the central area along the thickness direction of the steel sheet (silicon steel sheet) is controlled to be 12 to 35 through final annealing.

(Coating Formation Process)

In the coating formation process, the insulation coating is formed for the silicon steel sheet after final annealing. For instance, the insulation coating may be either the organic coating or the inorganic coating. The forming conditions of insulation coating may be the same as those of the insulation coating of conventional non oriented electrical steel sheet.

The non oriented electrical steel sheet in which the alignment degree to {5 5 7}<7 14 5> orientation is favorably controlled by the above processes is suitable as the magnetic material such as rotating machines, small and medium-size transformers, and electrical components, and especially, is suitable as the magnetic material for the split core of motor.

Hereinafter, a case where the non oriented electrical steel sheet according to the embodiment is used for the split core of motor is explained.

Figure 3:
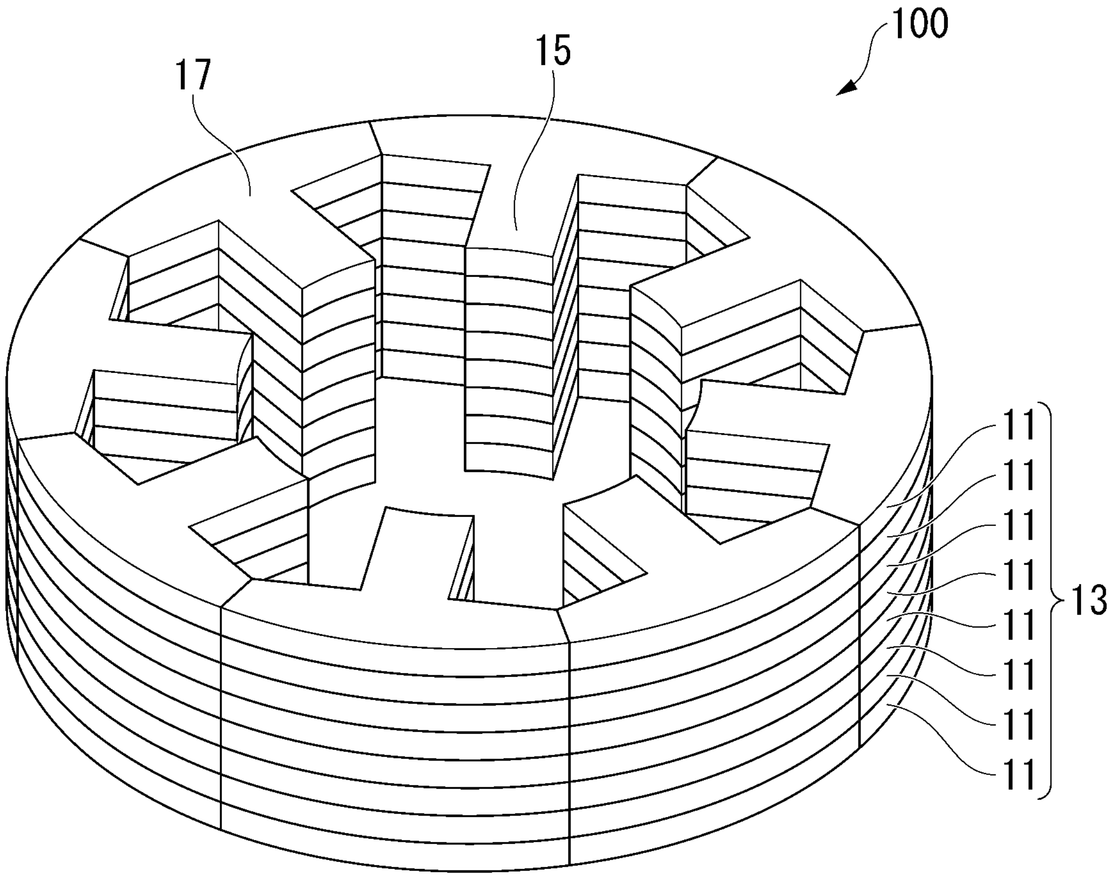
FIG. 3 is an illustration showing an instance of motor core.

FIG. 3 is an illustration showing an instance of the split core of motor. As shown in FIG. 3, the motor core 100 includes the punched piece 11 and the lamination 13 in which the punched pieces 11 are laminated and unified. The punched piece 11 is prepared by punching the non oriented electrical steel sheet. The punched piece 11 includes the yoke 17 with arc-shape and the teeth 15 which protrudes inward in the radial direction from the inner peripheral surface of the yoke 17. The punched piece 11 is arranged in an annular shape, and thereby, the motor core 100 is configured.

The shape, the number arranged in the annular shape, the number of layers, and the like of the punched piece 11 may be designed according to the purpose.

EXAMPLES

Hereinafter, the effects of an aspect of the present invention are described in detail with reference to the following examples. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention.

Example 1

The slab with the adjusted composition was cast, and then, the silicon steel sheet was produced by controlling the production conditions in each process. The chemical compositions of the silicon steel sheets are shown in Tables 1 and 2, and the production conditions are shown in Tables 3 to 8. In the above production, the hot rolling and the heat conservation treatment were conducted under the conditions shown in Tables 3 to 5, the cooling was conducted to room temperature, and then, the pickling was conducted. Herein, the specimen described as "hot rolled steel sheet annealing" in the "heat conservation treatment" column in the tables was cooled to room temperature without the heat conservation treatment during cooling after hot rolling. Thereafter, the hot rolled steel sheet annealing was conducted in the atmosphere of 100% nitrogen at 800° C. for 60 seconds, the cooling was conducted to room temperature, and then, the pickling was conducted.

The measurement result of the fraction of non-recrystallized grains in the microstructure of the steel sheet which was after the casting process, the hot rolling process, the heat conservation process, and the pickling process and which was before the cold rolling process are shown in Tables 3 to 5. Herein, the fraction of non-recrystallized grains was measured on the basis of the above method.

For the steel sheets whose fraction of non-recrystallized grains was measured, the cold rolling and the final annealing were conducted under conditions shown in Tables 6 to 8. In the final annealing, the holding temperature was 800 to 1100° C. which was equal to or higher than the recrystallization temperature, and the holding time was 30 seconds. Moreover, for the silicon steel sheet after final annealing, the phosphate based insulation coating with the average thickness of 1 μm was formed. Herein, with respect to the "final annealing" column in tables, the "heating rate A" expresses the average heating rate from the heating start temperature to 750° C., the "heating rate B" expresses the average heating rate from 750° C. to the holding temperature for final annealing, and the "control of heating rates" expresses the relationship of the heating rate A and the heating rate B.

The measurement result of the alignment degree to {5 5 7}<7 14 5> orientation in the central area along the thickness direction of the silicon steel sheet of the produced non oriented electrical steel sheet are shown as "alignment degree of texture" in Tables 6 to 8. Herein, the alignment degree to {5 5 7}<7 14 5> orientation was measured on the basis of the above method.

The chemical compositions of the silicon steel sheets are shown in Tables 1 and 2, and the production conditions and the production results are shown in Tables 3 to 8. Herein, the chemical compositions of the silicon steel sheets were substantially the same as those of the slabs. In the tables, "-" with respect to the chemical composition of silicon steel sheet indicates that no alloying element was intentionally added or that the content was less than detection limit. In the tables, the underlined value indicates out of the range of the present invention.

For the produced non oriented electrical steel sheet, the magnetic flux density was evaluated as the magnetic characteristics, and the roundness of the circular punched piece was evaluated as the punchability. The magnetic flux density and the roundness were measured on the basis of the above method. When the ratio $B_{50}/B_S$ was 0.82 or more, the magnetic characteristics was judged to as acceptable. Moreover, when the roundness of the circular punched piece was 45 μm or less, the punchability was judged to as acceptable.

The evaluation results of the magnetic characteristics and the punchability are shown in Tables 6 to 8. In the inventive examples of Nos. B1 to B22, the chemical composition and the texture of the silicon steel sheet were favorably controlled, and thus, the magnetic characteristics and the punchability were excellent as the non oriented electrical steel sheet.

On the other hand, in the comparative examples of Nos. b1 to b44, at least one of the chemical composition and the texture of the silicon steel sheet was not favorably controlled, and thus, at least one of the magnetic characteristics and the punchability was not satisfied as the non oriented electrical steel sheet.

Figure 4:
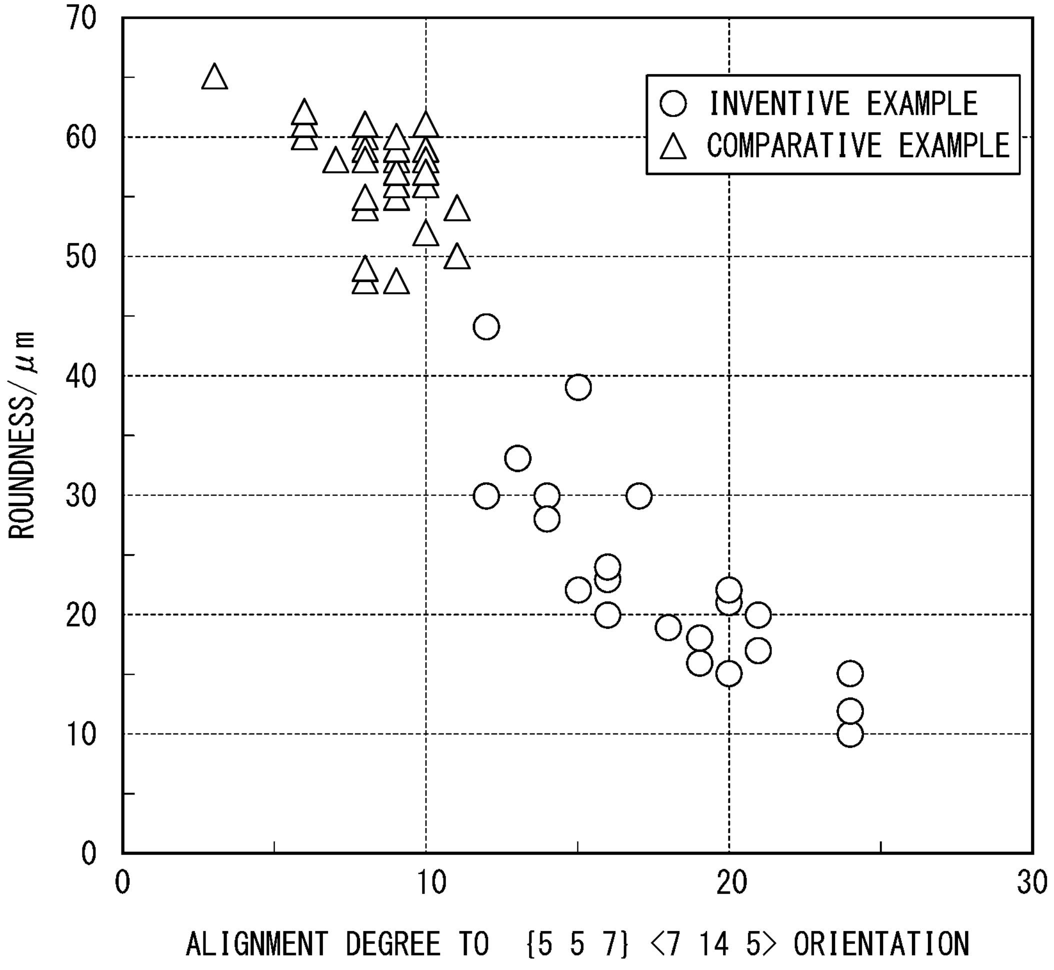
FIG. 4 is a diagram showing a relation of the alignment degree to {5 5 7}<7 14 5> orientation and roundness.

FIG. 4 is a diagram showing a relation of the alignment degree to {5 5 7}<7 14 5> orientation and roundness. FIG. 4 is the diagram showing the relation of the alignment degree to {5 5 7}<7 14 5> orientation and the roundness on the basis of the inventive examples of Nos. B1 to B22 and the comparative examples of Nos. b1 to b44. FIG. 4 shows that the roundness decreases with increase the alignment degree to {5 5 7}<7 14 5> orientation.

TABLE 1

| STEEL No. | PRODUCTION CONDITIONS AND PRODUCTION RESULTS CHEMICAL COMPOSITION OF SILICON STEEL SHEET (IN UNITS OF MASS %, BALANCE CONSISTING OF Fe AND IMPURITIES) | | | | | | | | | | | | | |
|---|---|---|---|---|---|---|---|---|---|---|---|---|---|---|
| | C | Si | Mn | Al | P | S | N | B | Sb | Sn | Cu | REM | Ca | Mg |
| A1 | 0.0029 | 2.953 | 0.209 | 0.490 | 0.034 | 0.0017 | 0.0023 | 0.0011 | — | — | — | — | — | — |
| A2 | 0.0026 | 0.011 | 0.156 | 0.114 | 0.087 | 0.0011 | 0.0026 | 0.0013 | — | — | — | — | — | — |
| A3 | 0.0027 | 3.448 | 0.271 | 0.904 | 0.122 | 0.0018 | 0.0025 | 0.0011 | — | — | — | — | — | — |
| A4 | 0.0025 | 0.216 | 0.011 | 0.534 | 0.147 | 0.0025 | 0.0022 | 0.0015 | — | — | — | — | — | — |
| A5 | 0.0026 | 2.534 | 2.998 | 1.309 | 0.138 | 0.0022 | 0.0021 | 0.0014 | — | — | — | — | — | — |
| A6 | 0.0028 | 0.826 | 0.124 | 0.001 | 0.112 | 0.0019 | 0.0029 | 0.0016 | — | — | — | — | — | — |
| A7 | 0.0024 | 2.889 | 0.253 | 2.447 | 0.147 | 0.0009 | 0.0017 | 0.0017 | — | — | — | — | — | — |
| A8 | 0.0021 | 3.022 | 0.227 | 1.453 | 0.18 | 0.0008 | 0.0011 | 0.0012 | — | — | — | — | — | — |
| A9 | 0.0028 | 3.029 | 2.112 | 0.589 | 0.044 | 0.0029 | 0.0018 | 0.0009 | — | — | — | — | — | — |
| A10 | 0.0021 | 1.876 | 0.576 | 0.239 | 0.087 | 0.0017 | 0.0029 | 0.0008 | — | — | — | — | — | — |
| A11 | 0.0017 | 2.448 | 1.006 | 0.875 | 0.049 | 0.0019 | 0.0019 | 0.0018 | — | — | — | — | — | — |
| A12 | 0.0015 | 1.189 | 0.227 | 0.284 | 0.093 | 0.0022 | 0.0022 | 0.0008 | 0.0479 | — | — | — | — | — |
| A13 | 0.0009 | 2.889 | 1.087 | 0.034 | 0.153 | 0.0026 | 0.0025 | 0.0011 | — | 0.18 | — | — | — | — |
| A14 | 0.0008 | 1.665 | 0.228 | 0.038 | 0.034 | 0.0016 | 0.0023 | 0.0014 | 0.0231 | 0.09 | — | — | — | — |
| A15 | 0.0018 | 2.238 | 1.084 | 0.699 | 0.139 | 0.0022 | 0.0011 | 0.0004 | 0.0119 | 0.04 | — | — | — | — |
| A16 | 0.0025 | 2.673 | 0.093 | 0.781 | 0.011 | 0.0018 | 0.0018 | 0.0007 | 0.0161 | 0.03 | — | — | — | — |
| A17 | 0.0014 | 1.452 | 1.987 | 0.117 | 0.026 | 0.0022 | 0.0026 | 0.0017 | 0.0229 | 0.05 | — | — | — | — |
| A18 | 0.0020 | 2.048 | 0.210 | 0.321 | 0.025 | 0.0012 | 0.0025 | 0.0012 | — | — | 0.5 | — | — | — |
| A19 | 0.0021 | 3.019 | 0.208 | 0.312 | 0.023 | 0.0025 | 0.0023 | 0.0014 | — | — | — | 0.0050 | — | — |
| A20 | 0.0023 | 3.022 | 0.215 | 0.297 | 0.033 | 0.0026 | 0.0020 | 0.0011 | — | — | — | — | 0.0040 | — |
| A21 | 0.0020 | 3.031 | 0.221 | 0.284 | 0.029 | 0.0026 | 0.0018 | 0.0013 | — | — | — | — | — | 0.0030 |
| A22 | 0.0013 | 0.498 | 0.151 | 0.284 | 0.069 | 0.0011 | 0.0014 | 0.0010 | — | 0.01 | — | — | — | — |

TABLE 2

| STEEL No. | PRODUCTION CONDITIONS AND PRODUCTION RESULTS CHEMICAL COMPOSITION OF SILICON STEEL SHEET (IN UNITS OF MASS %, BALANCE CONSISTING OF Fe AND IMPURITIES) | | | | | | | | | | | | | |
|---|---|---|---|---|---|---|---|---|---|---|---|---|---|---|
| | C | Si | Mn | Al | P | S | N | B | Sb | Sn | Cu | REM | Ca | Mg |
| a1 | 0.0055 | 3.224 | 0.251 | 0.451 | 0.115 | 0.0029 | 0.0025 | 0.002 | 0.0039 | 0.16 | — | — | — | — |
| a2 | 0.0022 | 0.004 | 0.272 | 0.185 | 0.097 | 0.0009 | 0.0022 | 0.0016 | 0.0021 | 0.13 | — | — | — | — |
| a3 | 0.0026 | 4.106 | 0.114 | 1.003 | 0.152 | 0.0023 | 0.0028 | 0.0019 | 0.0031 | 0.07 | — | — | — | — |
| a4 | 0.0013 | 2.167 | 0.002 | 0.509 | 0.116 | 0.0018 | 0.0027 | 0.0018 | 0.0019 | 0.02 | — | — | — | — |
| a5 | 0.0006 | 1.459 | 3.504 | 0.202 | 0.139 | 0.0014 | 0.0021 | 0.0009 | 0.0025 | 0.12 | — | — | — | — |
| a6 | 0.0009 | 2.928 | 0.373 | 0.0004 | 0.082 | 0.0027 | 0.0023 | 0.0017 | 0.0037 | 0.05 | — | — | — | — |
| a7 | 0.0015 | 2.201 | 0.684 | 2.803 | 0.166 | 0.0011 | 0.0019 | 0.0016 | 0.0028 | 0.09 | — | — | — | — |
| a8 | 0.0014 | 1.806 | 0.785 | 0.616 | 0.292 | 0.0021 | 0.0011 | 0.0017 | 0.0033 | 0.07 | — | — | — | — |
| a9 | 0.0011 | 2.717 | 1.529 | 1.225 | 0.087 | 0.0039 | 0.0021 | 0.0016 | 0.0022 | 0.14 | — | — | — | — |
| a10 | 0.0009 | 1.512 | 0.901 | 0.305 | 0.123 | 0.0016 | 0.0051 | 0.0006 | 0.0035 | 0.11 | — | — | — | — |
| a11 | 0.0008 | 2.599 | 2.437 | 0.904 | 0.145 | 0.0025 | 0.0029 | 0.003 | 0.0018 | 0.03 | — | — | — | — |
| a12 | 0.0025 | 3.342 | 2.896 | 2.456 | 0.093 | 0.0009 | 0.0019 | 0.0009 | — | — | — | — | — | — |
| a13 | 0.0029 | 0.013 | 0.027 | 0.004 | 0.098 | 0.0008 | 0.0017 | 0.0010 | — | — | — | — | — | — |
| a14 | 0.0024 | 3.126 | 1.545 | 1.243 | 0.091 | 0.0010 | 0.0019 | 0.0011 | — | — | — | — | — | — |
| a16 | 0.0021 | 2.044 | 2.951 | 1.124 | 0.095 | 0.0008 | 0.0020 | 0.0008 | — | — | — | — | — | — |
| a17 | 0.0023 | 2.102 | 1.122 | 0.005 | 0.095 | 0.0011 | 0.0018 | 0.0009 | — | — | — | — | — | — |
| a18 | 0.0011 | 0.502 | 0.169 | 0.311 | 0.073 | 0.0009 | 0.0018 | 0.0008 | — | 0.01 | — | — | — | — |
| a19 | 0.0012 | 0.499 | 0.172 | 0.308 | 0.074 | 0.0008 | 0.0021 | 0.0007 | — | 0.01 | — | — | — | — |
| a20 | 0.0021 | 2.242 | 1.104 | 0.708 | 0.145 | 0.0019 | 0.0009 | 0.0006 | — | — | — | — | — | — |

TABLE 3

| | | PRODUCTION CONDITIONS AND PRODUCTION RESULTS | | | | | |
|---|---|---|---|---|---|---|---|
| | | | | | HOT ROLLING | | |
| | | CASTING | | | SLAB | | FINAL ROLLING |
| TEST No. | STEEL No. | Si MASS % | Mn MASS % | Al MASS % | HEATING TEMPERATURE ° C. | CUMULATIVE REDUCTION % | FINISH TEMPERATURE ° C. |
| B1 | A1 | 2.953 | 0.209 | 0.490 | 1100 | 98.5 | 880 |
| B2 | A2 | 0.011 | 0.156 | 0.114 | 1200 | 98.0 | 810 |
| B3 | A3 | 3.448 | 0.271 | 0.904 | 1150 | 98.5 | 890 |
| B4 | A4 | 0.216 | 0.011 | 0.534 | 1200 | 98.0 | 830 |

TABLE 3-continued

| | | | | | | | |
|---|---|---|---|---|---|---|---|
| B5 | A5 | 2.534 | 2.998 | 1.309 | 1150 | 98.5 | 950 |
| B6 | A6 | 0.826 | 0.124 | 0.001 | 1230 | 98.5 | 850 |
| B7 | A7 | 2.889 | 0.253 | 2.447 | 1150 | 98.5 | 900 |
| B8 | A8 | 3.022 | 0.227 | 1.453 | 1150 | 99.0 | 950 |
| B9 | A9 | 3.029 | 2.112 | 0.589 | 1080 | 98.5 | 880 |
| B10 | A10 | 1.876 | 0.576 | 0.239 | 1180 | 98.5 | 940 |
| B11 | A11 | 2.448 | 1.006 | 0.875 | 1150 | 98.5 | 900 |
| B12 | A12 | 1.189 | 0.227 | 0.284 | 1175 | 99.0 | 930 |
| B13 | A13 | 2.889 | 1.087 | 0.034 | 1150 | 98.5 | 900 |
| B14 | A14 | 1.665 | 0.228 | 0.038 | 1150 | 99.0 | 900 |
| B15 | A15 | 2.238 | 1.084 | 0.699 | 1180 | 99.0 | 890 |
| B16 | A16 | 2.673 | 0.093 | 0.781 | 1150 | 98.5 | 900 |
| B17 | A17 | 1.452 | 1.987 | 0.117 | 1130 | 98.5 | 880 |
| B18 | A18 | 2.048 | 0.210 | 0.321 | 1200 | 99.0 | 880 |
| B19 | A19 | 3.019 | 0.208 | 0.312 | 1150 | 98.5 | 900 |
| B20 | A20 | 3.022 | 0.215 | 0.297 | 1170 | 98.5 | 910 |
| B21 | A21 | 3.031 | 0.221 | 0.284 | 1150 | 99.0 | 890 |
| B22 | A22 | 0.498 | 0.151 | 0.284 | 1280 | 98.5 | 820 |

| | PRODUCTION CONDITIONS AND PRODUCTION RESULTS | | | |
|---|---|---|---|---|
| | HOT ROLLING | HEAT CONSERVATION TREATMENT | | FRACTION OF NON-RECRYSTALLIZED |
| TEST No. | FINAL ROLLING COOLING RATE ° C./SECOND | HEAT CONSERVATION TEMPERATURE ° C. | HEAT CONSERVATION TIME MINUTES | GRAINS IN STEEL SHEET BEFORE COLD ROLLING AREA % |
| B1 | 120 | 800 | 30 | 17 |
| B2 | 180 | 780 | 15 | 18 |
| B3 | 100 | 750 | 30 | 13 |
| B4 | 170 | 780 | 20 | 14 |
| B5 | 130 | 705 | 60 | 19 |
| B6 | 120 | 780 | 15 | 17 |
| B7 | 120 | 780 | 70 | 11 |
| B8 | 130 | 845 | 120 | 18 |
| B9 | 130 | 780 | 80 | 18 |
| B10 | 130 | 780 | 10 | 11 |
| B11 | 120 | 750 | 80 | 18 |
| B12 | 130 | 790 | 180 | 18 |
| B13 | 110 | 780 | 80 | 17 |
| B14 | 130 | 810 | 50 | 20 |
| B15 | 140 | 770 | 70 | 18 |
| B16 | 130 | 800 | 50 | 15 |
| B17 | 120 | 780 | 40 | 15 |
| B18 | 120 | 780 | 15 | 16 |
| B19 | 130 | 790 | 30 | 16 |
| B20 | 150 | 780 | 50 | 14 |
| B21 | 130 | 800 | 70 | 15 |
| B22 | 180 | 710 | 15 | 16 |

TABLE 4

| | | PRODUCTION CONDITIONS AND PRODUCTION RESULTS | | | | | |
|---|---|---|---|---|---|---|---|
| | | | | | HOT ROLLING | | |
| | | CASTING | | | SLAB | | FINAL ROLLING |
| TEST No. | STEEL No. | Si MASS % | Mn MASS % | Al MASS % | HEATING TEMPERATURE ° C. | CUMULATIVE REDUCTION % | FINISH TEMPERATURE ° C. |
| b1 | a1 | 3.224 | 0.251 | 0.451 | 1160 | 98.5 | 950 |
| b2 | a2 | 0.004 | 0.272 | 0.185 | 1150 | 98.5 | 900 |
| b3 | a3 | 4.106 | 0.114 | 1.003 | 1150 | 98.5 | 900 |
| b4 | a4 | 2.167 | 0.002 | 0.509 | 1150 | 98.5 | 900 |
| b5 | a5 | 1.459 | 3.504 | 0.202 | 1150 | 98.5 | 900 |
| b6 | a6 | 2.928 | 0.373 | 0.0004 | 1150 | 98.5 | 900 |
| b7 | al | 2.201 | 0.684 | 2.803 | 1150 | 98.5 | 900 |
| b8 | a8 | 1.806 | 0.785 | 0.616 | 1180 | 98.5 | 890 |
| b9 | a9 | 2.717 | 1.529 | 1.225 | 1150 | 98.5 | 900 |
| b10 | a10 | 1.512 | 0.901 | 0.305 | 980 | 98.5 | 900 |
| b11 | a11 | 2.599 | 2.437 | 0.904 | 1175 | 98.5 | 900 |
| b12 | a12 | 3.342 | 2.896 | 2.456 | 1150 | 98.5 | 900 |

TABLE 4-continued

| | | | | | | | |
|---|---|---|---|---|---|---|---|
| b13 | a13 | 0.013 | 0.027 | 0.004 | 1150 | 98.5 | 900 |
| b14 | a14 | 3.126 | 1.545 | 1.243 | 1280 | 98.5 | 900 |
| b16 | a16 | 2.044 | 2.951 | 1.124 | 1150 | 98.5 | 810 |
| b17 | a17 | 2.102 | 1.122 | 0.005 | 1030 | 98.5 | 900 |
| b18 | a18 | 0.502 | 0.169 | 0.311 | 1150 | 99.5 | 890 |
| b19 | a19 | 0.499 | 0.172 | 0.308 | 1150 | 99.0 | 940 |
| b20 | a20 | 2.242 | 1.104 | 0.708 | 1270 | 98.5 | 805 |

| | PRODUCTION CONDITIONS AND PRODUCTION RESULTS | | | |
|---|---|---|---|---|
| | HOT ROLLING | HEAT CONSERVATION TREATMENT | | FRACTION OF NON-RECRYSTALLIZED |
| TEST No. | FINAL ROLLING COOLING RATE ° C./SECOND | HEAT CONSERVATION TEMPERATURE ° C. | HEAT CONSERVATION TIME MINUTES | GRAINS IN STEEL SHEET BEFORE COLD ROLLING AREA % |
| b1 | 130 | 680 | 60 | 22 |
| b2 | 130 | 780 | 80 | 7 |
| b3 | 130 | 780 | 80 | 21 |
| b4 | 130 | 780 | 80 | 8 |
| b5 | 130 | 780 | 80 | 22 |
| b6 | 130 | 780 | 80 | 9 |
| b7 | 130 | 780 | 80 | 23 |
| b8 | 75 | 720 | 5 | 8 |
| b9 | 130 | 780 | 80 | 11 |
| b10 | 130 | 780 | 80 | 8 |
| b11 | 130 | 700 | 240 | 7 |
| b12 | 130 | 780 | 80 | 22 |
| b13 | 130 | 780 | 80 | 7 |
| b14 | 130 | 710 | 80 | 23 |
| b16 | 130 | 780 | 11 | 22 |
| b17 | 130 | 840 | 80 | 7 |
| b18 | 80 | 800 | 15 | 9 |
| b19 | 85 | 850 | 15 | 8 |
| b20 | 130 | 715 | 80 | 21 |

TABLE 5

| | | PRODUCTION CONDITIONS AND PRODUCTION RESULTS | | | | | |
|---|---|---|---|---|---|---|---|
| | | | | | HOT ROLLING | | |
| | | CASTING | | | SLAB | | FINAL ROLLING |
| TEST No. | STEEL No. | Si MASS % | Mn MASS % | Al MASS % | HEATING TEMPERATURE ° C. | CUMULATIVE REDUCTION % | FINISH TEMPERATURE ° C. |
| b21 | a20 | 2.242 | 1.104 | 0.708 | 1045 | 99.5 | 900 |
| b22 | a20 | 2.242 | 1.104 | 0.708 | 1150 | 98.0 | 810 |
| b23 | a20 | 2.242 | 1.104 | 0.708 | 1150 | 98.5 | 900 |
| b24 | a20 | 2.242 | 1.104 | 0.708 | 980 | 98.5 | 900 |
| b25 | a20 | 2.242 | 1.104 | 0.708 | 1320 | 98.5 | 900 |
| b26 | a20 | 2.242 | 1.104 | 0.708 | 1150 | 97.0 | 900 |
| b27 | a20 | 2.242 | 1.104 | 0.708 | 1150 | 99.8 | 900 |
| b28 | a20 | 2.242 | 1.104 | 0.708 | 1150 | 98.5 | 780 |
| b29 | a20 | 2.242 | 1.104 | 0.708 | 1150 | 98.5 | 970 |
| b30 | a20 | 2.242 | 1.104 | 0.708 | 1150 | 98.5 | 900 |
| b31 | a20 | 2.242 | 1.104 | 0.708 | 1150 | 98.5 | 900 |
| b32 | a20 | 2.242 | 1.104 | 0.708 | 1150 | 98.5 | 900 |
| b33 | a20 | 2.242 | 1.104 | 0.708 | 1150 | 98.5 | 900 |
| b34 | a20 | 2.242 | 1.104 | 0.708 | 1150 | 98.5 | 900 |
| b35 | a20 | 2.242 | 1.104 | 0.708 | 1150 | 98.5 | 900 |
| b36 | a20 | 2.242 | 1.104 | 0.708 | 1150 | 98.5 | 900 |
| b37 | a20 | 2.242 | 1.104 | 0.708 | 1150 | 98.5 | 900 |
| b38 | a20 | 2.242 | 1.104 | 0.708 | 1150 | 98.5 | 900 |
| b39 | a20 | 2.242 | 1.104 | 0.708 | 1150 | 98.5 | 900 |
| b40 | a20 | 2.242 | 1.104 | 0.708 | 1150 | 98.5 | 900 |
| b41 | a20 | 2.242 | 1.104 | 0.708 | 1150 | 98.5 | 900 |
| b42 | a20 | 2.242 | 1.104 | 0.708 | 1150 | 98.5 | 900 |
| b43 | a20 | 2.242 | 1.104 | 0.708 | 1150 | 98.5 | 900 |
| b44 | a20 | 2.242 | 1.104 | 0.708 | 1150 | 98.5 | 900 |

TABLE 5-continued

| TEST No. | HOT ROLLING: FINAL ROLLING COOLING RATE ° C./SECOND | HEAT CONSERVATION TREATMENT: HEAT CONSERVATION TEMPERATURE ° C. | HEAT CONSERVATION TREATMENT: HEAT CONSERVATION TIME MINUTES | FRACTION OF NON-RECRYSTALLIZED GRAINS IN STEEL SHEET BEFORE COLD ROLLING AREA % |
|---|---|---|---|---|
| b21 | 130 | 780 | 170 | 8 |
| b22 | 190 | 780 | 80 | 23 |
| b23 | 90 | 830 | 170 | 6 |
| b24 | 130 | 780 | 80 | 8 |
| b25 | 130 | 780 | 80 | 22 |
| b26 | 130 | 780 | 80 | 23 |
| b27 | 130 | 780 | 80 | 9 |
| b28 | 130 | 780 | 80 | 22 |
| b29 | 130 | 780 | 80 | 8 |
| b30 | 75 | 780 | 80 | 9 |
| b31 | 210 | 780 | 80 | 21 |
| b32 | 130 | 680 | 80 | 22 |
| b33 | 130 | 870 | 80 | 8 |
| b34 | 130 | 780 | 8 | 23 |
| b35 | 130 | 780 | 185 | 9 |
| b36 | 130 | 780 | 80 | 15 |
| b37 | 130 | 780 | 80 | 15 |
| b38 | 130 | 780 | 80 | 15 |
| b39 | 130 | 780 | 80 | 15 |
| b40 | 130 | 780 | 80 | 15 |
| b41 | 130 | 780 | 80 | 15 |
| b42 | 130 | 780 | 80 | 15 |
| b43 | 130 | 780 | 80 | 15 |
| b44 | 130 | HOT ROLLED STEEL SHEET ANNEALING | | 0 |

TABLE 6

| TEST No. | STEEL No. | COLD ROLLING CUMULATIVE REDUCTION % | FINAL ANNEALING: HEATING RATE A °C/SECOND | FINAL ANNEALING: HEATING RATE B °C/SECOND | FINAL ANNEALING: CONTROL OF HEATING RATES | ALIGNMENT DEGREE OF TEXTURE |
|---|---|---|---|---|---|---|
| B1 | A1 | 88.5 | 30 | 40 | good | 18 |
| B2 | A2 | 88.0 | 10 | 30 | good | 15 |
| B3 | A3 | 88.0 | 25 | 30 | good | 13 |
| B4 | A4 | 87.5 | 40 | 60 | good | 14 |
| B5 | A5 | 89.0 | 20 | 30 | good | 15 |
| B6 | A6 | 88.0 | 25 | 40 | good | 19 |
| B7 | A7 | 88.5 | 20 | 35 | good | 12 |
| B8 | A8 | 88.0 | 50 | 80 | good | 16 |
| B9 | A9 | 94.0 | 25 | 30 | good | 16 |
| B10 | A10 | 88.0 | 40 | 50 | good | 12 |
| B11 | A11 | 87.0 | 25 | 30 | good | 17 |
| B12 | A12 | 88.0 | 20 | 35 | good | 20 |
| B13 | A13 | 81.0 | 25 | 30 | good | 14 |
| B14 | A14 | 90.0 | 35 | 55 | good | 16 |
| B15 | A15 | 88.0 | 25 | 30 | good | 20 |
| B16 | A16 | 88.5 | 25 | 30 | good | 24 |
| B17 | A17 | 88.5 | 45 | 55 | good | 24 |
| B18 | A18 | 83.0 | 25 | 40 | good | 19 |
| B19 | A19 | 85.0 | 20 | 35 | good | 21 |
| B20 | A20 | 88.0 | 25 | 30 | good | 20 |
| B21 | A21 | 87.5 | 30 | 35 | good | 21 |
| B22 | A22 | 83.0 | 35 | 60 | good | 24 |

TABLE 6-continued

| | EVALUATION RESULTS | | | | |
|---|---|---|---|---|---|
| | MAGNETIC FLUX DENSITY | | | PUNCHABILITY | |
| TEST No. | $B_{50}$ T | $B_S$ T | $B_{50}/B_S$ | ROUNDNESS μm | NOTE |
| B1 | 1.708 | 2.033 | 0.84 | 19 | INVENTIVE EXAMPLE |
| B2 | 1.698 | 2.046 | 0.83 | 22 | INVENTIVE EXAMPLE |
| B3 | 1.609 | 1.962 | 0.82 | 33 | INVENTIVE EXAMPLE |
| B4 | 1.654 | 1.993 | 0.83 | 30 | INVENTIVE EXAMPLE |
| B5 | 1.596 | 1.921 | 0.83 | 39 | INVENTIVE EXAMPLE |
| B6 | 1.789 | 2.125 | 0.84 | 16 | INVENTIVE EXAMPLE |
| B7 | 1.688 | 2.034 | 0.83 | 44 | INVENTIVE EXAMPLE |
| B8 | 1.614 | 1.947 | 0.83 | 23 | INVENTIVE EXAMPLE |
| B9 | 1.715 | 2.042 | 0.84 | 20 | INVENTIVE EXAMPLE |
| B10 | 1.728 | 2.060 | 0.84 | 30 | INVENTIVE EXAMPLE |
| B11 | 1.708 | 2.058 | 0.83 | 30 | INVENTIVE EXAMPLE |
| B12 | 1.725 | 2.091 | 0.83 | 21 | INVENTIVE EXAMPLE |
| B13 | 1.719 | 2.071 | 0.83 | 28 | INVENTIVE EXAMPLE |
| B14 | 1.730 | 2.087 | 0.83 | 24 | INVENTIVE EXAMPLE |
| B15 | 1.725 | 2.104 | 0.82 | 22 | INVENTIVE EXAMPLE |
| B16 | 1.716 | 2.043 | 0.84 | 10 | INVENTIVE EXAMPLE |
| B17 | 1.720 | 2.024 | 0.85 | 12 | INVENTIVE EXAMPLE |
| B18 | 1.725 | 2.006 | 0.86 | 18 | INVENTIVE EXAMPLE |
| B19 | 1.738 | 2.069 | 0.84 | 20 | INVENTIVE EXAMPLE |
| B20 | 1.721 | 2.001 | 0.86 | 15 | INVENTIVE EXAMPLE |
| B21 | 1.745 | 2.029 | 0.86 | 17 | INVENTIVE EXAMPLE |
| B22 | 1.718 | 2.070 | 0.83 | 15 | INVENTIVE EXAMPLE |

TABLE 7

| | | PRODUCTION CONDITIONS AND PRODUCTION RESULTS | | | | |
|---|---|---|---|---|---|---|
| | | COLD | FINAL ANNEALING | | | |
| TEST No. | STEEL No. | ROLLING CUMULATIVE REDUCTION % | HEATING RATE A ° C./SECOND | HEATING RATE B ° C./SECOND | CONTROL OF HEATING RATES | ALIGNMENT DEGREE OF TEXTURE |
| b1 | a1 | 88.0 | 25 | 30 | good | 9 |
| b2 | a2 | 88.0 | 25 | 30 | good | 8 |
| b3 | a3 | 88.0 | 25 | 30 | good | 11 |
| b4 | a4 | 88.0 | 25 | 30 | good | 8 |
| b5 | a5 | 88.0 | 25 | 30 | good | 9 |
| b6 | a6 | 88.0 | 25 | 30 | good | 11 |
| b7 | a7 | 88.0 | 25 | 30 | good | 7 |
| b8 | a8 | 88.0 | 25 | 30 | good | 11 |
| b9 | a9 | 88.0 | 25 | 30 | good | 6 |
| b10 | a10 | 88.0 | 25 | 30 | good | 10 |
| b11 | a11 | 88.0 | 25 | 30 | good | 6 |
| b12 | a12 | 88.0 | 25 | 30 | good | 9 |
| b13 | a13 | 88.0 | 25 | 30 | good | 8 |
| b14 | a14 | 88.0 | 25 | 30 | good | 10 |
| b16 | a 16 | 88.0 | 25 | 30 | good | 9 |
| b17 | a17 | 88.0 | 25 | 30 | good | 8 |
| b18 | a18 | 88.0 | 25 | 30 | good | 8 |
| b19 | a19 | 88.0 | 25 | 30 | good | 9 |
| b20 | a20 | 88.0 | 25 | 30 | good | 10 |

| | EVALUATION RESULTS | | | | |
|---|---|---|---|---|---|
| | MAGNETIC FLUX DENSITY | | | PUNCHABILITY | |
| TEST No. | $B_{50}$ T | $B_S$ T | $B_{50}/B_S$ | ROUNDNESS μm | NOTE |
| b1 | 1.629 | 2.001 | 0.81 | 48 | COMPARATIVE EXAMPLE |
| b2 | 1.601 | 1.969 | 0.81 | 48 | COMPARATIVE EXAMPLE |
| b3 | 1.571 | 1.956 | 0.80 | 50 | COMPARATIVE EXAMPLE |
| b4 | 1.636 | 2.042 | 0.80 | 49 | COMPARATIVE EXAMPLE |
| b5 | 1.625 | 2.057 | 0.79 | 55 | COMPARATIVE EXAMPLE |
| b6 | 1.602 | 2.003 | 0.80 | 54 | COMPARATIVE EXAMPLE |
| b7 | 1.573 | 1.942 | 0.81 | 58 | COMPARATIVE EXAMPLE |
| b8 | 1.624 | 2.035 | 0.80 | 50 | COMPARATIVE EXAMPLE |

TABLE 7-continued

| | | | | | |
|---|---|---|---|---|---|
| b9 | 1.591 | 1.964 | 0.81 | 60 | COMPARATIVE EXAMPLE |
| b10 | 1.605 | 2.006 | 0.80 | 52 | COMPARATIVE EXAMPLE |
| b11 | 1.570 | 1.953 | 0.80 | 61 | COMPARATIVE EXAMPLE |
| b12 | 1.609 | 2.037 | 0.79 | 58 | COMPARATIVE EXAMPLE |
| b13 | 1.601 | 2.001 | 0.80 | 60 | COMPARATIVE EXAMPLE |
| b14 | 1.603 | 2.029 | 0.79 | 61 | COMPARATIVE EXAMPLE |
| b16 | 1.610 | 2.038 | 0.79 | 59 | COMPARATIVE EXAMPLE |
| b17 | 1.605 | 2.006 | 0.80 | 58 | COMPARATIVE EXAMPLE |
| b18 | 1.609 | 2.037 | 0.79 | 54 | COMPARATIVE EXAMPLE |
| b19 | 1.604 | 2.030 | 0.79 | 60 | COMPARATIVE EXAMPLE |
| b20 | 1.606 | 2.008 | 0.80 | 58 | COMPARATIVE EXAMPLE |

TABLE 8

| | | PRODUCTION CONDITIONS AND PRODUCTION RESULTS | | | | |
|---|---|---|---|---|---|---|
| | | COLD | FINAL ANNEALING | | | |
| TEST No. | STEEL No. | ROLLING CUMULATIVE REDUCTION % | HEATING RATE A ° C./SECOND | HEATING RATE B ° C./SECOND | CONTROL OF HEATING RATES | ALIGNMENT DEGREE OF TEXTURE |
| b21 | a20 | 88.0 | 25 | 30 | good | 10 |
| b22 | a20 | 88.0 | 25 | 30 | good | 9 |
| b23 | a20 | 88.0 | 25 | 30 | good | 10 |
| b24 | a20 | 88.0 | 25 | 30 | good | 8 |
| b25 | a20 | 88.0 | 25 | 30 | good | 9 |
| b26 | a20 | 88.0 | 25 | 30 | good | 8 |
| b27 | a20 | 88.0 | 25 | 30 | good | 10 |
| b28 | a20 | 88.0 | 25 | 30 | good | 10 |
| b29 | a20 | 88.0 | 25 | 30 | good | 9 |
| b30 | a20 | 88.0 | 25 | 30 | good | 9 |
| b31 | a20 | 88.0 | 25 | 30 | good | 8 |
| b32 | a20 | 88.0 | 25 | 30 | good | 8 |
| b33 | a20 | 88.0 | 25 | 30 | good | 8 |
| b34 | a20 | 88.0 | 25 | 30 | good | 9 |
| b35 | a20 | 88.0 | 25 | 30 | good | 10 |
| b36 | a20 | 78.0 | 25 | 30 | good | 9 |
| b37 | a20 | 97.0 | 25 | 30 | good | 6 |
| b38 | a20 | 88.0 | 3 | 30 | good | 9 |
| b39 | a20 | 88.0 | 55 | 65 | good | 8 |
| b40 | a20 | 88.0 | 10 | 18 | good | 6 |
| b41 | a20 | 88.0 | 25 | 102 | good | 9 |
| b42 | a20 | 88.0 | 40 | 40 | bad | 9 |
| b43 | a20 | 88.0 | 45 | 35 | bad | 8 |
| b44 | a20 | 88.0 | 25 | 30 | good | 3 |

| | EVALUATION RESULTS | | | | |
|---|---|---|---|---|---|
| | MAGNETIC FLUX DENSITY | | | PUNCHABILITY | |
| TEST No. | $B_{50}$ T | $B_S$ T | $B_{50}/B_S$ | ROUNDNESS μm | NOTE |
| b21 | 1.608 | 1.985 | 0.81 | 59 | COMPARATIVE EXAMPLE |
| b22 | 1.608 | 2.062 | 0.78 | 60 | COMPARATIVE EXAMPLE |
| b23 | 1.602 | 2.028 | 0.79 | 57 | COMPARATIVE EXAMPLE |
| b24 | 1.604 | 2.030 | 0.79 | 55 | COMPARATIVE EXAMPLE |
| b25 | 1.605 | 2.006 | 0.80 | 56 | COMPARATIVE EXAMPLE |
| b26 | 1.607 | 2.034 | 0.79 | 55 | COMPARATIVE EXAMPLE |
| b27 | 1.606 | 2.033 | 0.79 | 56 | COMPARATIVE EXAMPLE |
| b28 | 1.605 | 2.006 | 0.80 | 58 | COMPARATIVE EXAMPLE |
| b29 | 1.610 | 2.038 | 0.79 | 59 | COMPARATIVE EXAMPLE |
| b30 | 1.611 | 2.065 | 0.78 | 60 | COMPARATIVE EXAMPLE |
| b31 | 1.608 | 2.010 | 0.80 | 59 | COMPARATIVE EXAMPLE |
| b32 | 1.601 | 2.027 | 0.79 | 61 | COMPARATIVE EXAMPLE |
| b33 | 1.600 | 2.025 | 0.79 | 58 | COMPARATIVE EXAMPLE |
| b34 | 1.607 | 2.009 | 0.80 | 57 | COMPARATIVE EXAMPLE |
| b35 | 1.604 | 2.030 | 0.79 | 57 | COMPARATIVE EXAMPLE |
| b36 | 1.606 | 2.008 | 0.80 | 59 | COMPARATIVE EXAMPLE |
| b37 | 1.605 | 2.058 | 0.78 | 61 | COMPARATIVE EXAMPLE |
| b38 | 1.605 | 2.006 | 0.80 | 60 | COMPARATIVE EXAMPLE |
| b39 | 1.601 | 2.027 | 0.79 | 61 | COMPARATIVE EXAMPLE |
| b40 | 1.610 | 2.091 | 0.77 | 62 | COMPARATIVE EXAMPLE |
| b41 | 1.609 | 1.986 | 0.81 | 59 | COMPARATIVE EXAMPLE |
| b42 | 1.607 | 2.034 | 0.79 | 60 | COMPARATIVE EXAMPLE |

TABLE 8-continued

| | | | | | |
|---|---|---|---|---|---|
| b43 | 1.606 | 2.008 | 0.80 | 61 | COMPARATIVE EXAMPLE |
| b44 | 1.726 | 2.105 | 0.82 | 65 | COMPARATIVE EXAMPLE |

INDUSTRIAL APPLICABILITY

According to the above aspects of the present invention, it is possible to provide the non oriented electrical steel sheet excellent in both the punchability and the magnetic characteristics in two directions of the rolling direction and the transverse direction for the split core, and the method for producing thereof. Accordingly, the present invention has significant industrial applicability.

REFERENCE SIGNS LIST

1 NON ORIENTED ELECTRICAL STEEL SHEET
3 SILICON STEEL SHEET (BASE STEEL SHEET)
5 INSULATION COATING
11 PUNCHED PIECE
13 LAMINATION
15 TEETH
17 YOKE
100 MOTOR CORE

What is claimed is:

1. A non oriented electrical steel sheet comprising a silicon steel sheet and an insulation coating, characterized in that the silicon steel sheet contains, as a chemical composition, by mass %,
0.01 to 3.50% of Si,
0.001 to 2.500% of Al,
0.01 to 3.00% of Mn,
0.0030% or less of C,
0.180% or less of P,
0.003% or less of S,
0.003% or less of N,
0.002% or less of B,
0 to 0.05% of Sb,
0 to 0.20% of Sn,
0 to 1.00% of Cu,
0 to 0.0400% of rare earth metal (REM),
0 to 0.0400% of Ca,
0 to 0.0400% of Mg, and
a balance consisting of Fe and impurities, and
an alignment degree to {5 5 7}<7 14 5> orientation in a central area along a thickness direction of the silicon steel sheet is 12 to 35.

2. The non oriented electrical steel sheet according to claim 1, wherein the silicon steel sheet contains, as the chemical composition, by mass %, at least one of
0.001 to 0.05% of Sb,
0.01 to 0.20% of Sn,
0.10 to 1.00% of Cu,
0.0005 to 0.0400% of rare earth metal (REM),
0.0005 to 0.0400% of Ca, and
0.0005 to 0.0400% of Mg.

3. The non oriented electrical steel sheet according to claim 1, wherein the alignment degree to {5 5 7}<7 14 5> orientation is 18 to 35.

4. A method for producing the non oriented electrical steel sheet according to claim 1, the method comprising a casting process, a hot rolling process, an heat conservation process, a pickling process, a cold rolling process, a final annealing process, and a coating formation process, wherein in the casting process, a slab is cast, the slab including, as a chemical composition, by mass %,
0.01 to 3.50% of Si,
0.001 to 2.500% of Al,
0.01 to 3.00% of Mn,
0.0030% or less of C,
0.180% or less of P,
0.003% or less of S,
0.003% or less of N,
0.002% or less of B,
0 to 0.05% of Sb,
0 to 0.20% of Sn,
0 to 1.00% of Cu,
0 to 0.0400% of rare earth metal (REM),
0 to 0.0400% of Ca,
0 to 0.0400% of Mg, and
a balance consisting of Fe and impurities,
in the hot rolling process, a slab heating temperature before hot rolling is 1000 to 1300° C., a finish rolling temperature for final hot rolling is 800 to 950° C., a cumulative reduction of hot rolling is 98 to 99.5%, and an average cooling rate from a temperature after finishing the hot rolling to a heat conservation temperature for heat conservation treatment is 80 to 200° C./second,
in the heat conservation process, the heat conservation temperature is 700 to 850° C. and a heat conservation time is 10 to 180 minutes,
a fraction of non-recrystallized grains in a steel sheet before the cold rolling process is controlled to be 10 to 20 area %,
in the cold rolling process, a cumulative reduction of cold rolling is 80 to 95%, and
in the final annealing process, an average heating rate from a heating start temperature to 750° C. is 5 to 50° C./second, an average heating rate from 750° C. to a holding temperature for final annealing is changed to a heating rate which is faster than the average heating rate to 750° C. and which is within a range of 20 to 100° C./second, and the holding temperature for final annealing is a recrystallization temperature or higher.

5. A non oriented electrical steel sheet comprising a silicon steel sheet and an insulation coating, characterized in that the silicon steel sheet contains, as a chemical composition, by mass %,
0.01 to 3.50% of Si,
0.001 to 2.500% of Al,
0.01 to 3.00% of Mn,
0.0030% or less of C,
0.180% or less of P,
0.003% or less of S,
0.003% or less of N,
0.002% or less of B,
0 to 0.05% of Sb,
0 to 0.20% of Sn,
0 to 1.00% of Cu,
0 to 0.0400% of rare earth metal (REM),
0 to 0.0400% of Ca,
0 to 0.0400% of Mg, and a balance comprising Fe and impurities, and an alignment degree to {5 5 7}<7 14 5> orientation in a central area along a thickness direction of the silicon steel sheet is 12 to 35.

6. A method for producing the non oriented electrical steel sheet according to claim 1, the method comprising a casting process, a hot rolling process, an heat conservation process, a pickling process, a cold rolling process, a final annealing process, and a coating formation process, wherein in the casting process, a slab is cast, the slab including, as a chemical composition, by mass %, 0.01 to 3.50% of Si, 0.001 to 2.500% of Al, 0.01 to 3.00% of Mn, 0.0030% or less of C, 0.180% or less of P, 0.003% or less of S, 0.003% or less of N, 0.002% or less of B, 0 to 0.05% of Sb, 0 to 0.20% of Sn, 0 to 1.00% of Cu, 0 to 0.0400% of rare earth metal (REM), 0 to 0.0400% of Ca, 0 to 0.0400% of Mg, and a balance comprising Fe and impurities, in the hot rolling process, a slab heating temperature before hot rolling is 1000 to 1300° C., a finish rolling temperature for final hot rolling is 800 to 950° C., a cumulative reduction of hot rolling is 98 to 99.5%, and an average cooling rate from a temperature after finishing the hot rolling to a heat conservation temperature for heat conservation treatment is 80 to 200° C./second, in the heat conservation process, the heat conservation temperature is 700 to 850° C. and a heat conservation time is 10 to 180 minutes, a fraction of non-recrystallized grains in a steel sheet before the cold rolling process is controlled to be 10 to 20 area %, in the cold rolling process, a cumulative reduction of cold rolling is 80 to 95%, and in the final annealing process, an average heating rate from a heating start temperature to 750° C. is 5 to 50° C./second, an average heating rate from 750° C. to a holding temperature for final annealing is changed to a heating rate which is faster than the average heating rate to 750° C. and which is within a range of 20 to 100° C./second, and the holding temperature for final annealing is a recrystallization temperature or higher.

* * * * *